(12) United States Patent
Tsai et al.

(10) Patent No.: US 9,848,344 B2
(45) Date of Patent: Dec. 19, 2017

(54) METHODS AND APPARATUSES FOR ADVANCED RECEIVER DESIGN

(71) Applicant: InterDigital Technology Corporation, Wilmington, DE (US)

(72) Inventors: Allan Y. Tsai, Boonton, NJ (US); William E. Lawton, Pottstown, PA (US); Lakshmi R. Iyer, King of Prussia, PA (US); Muhammad U. Fazili, Audubon, PA (US); Manasa Raghavan, Sunnyvale, CA (US)

(73) Assignee: InterDigital Technology Corporation, Wilmington, DE (US)

( * ) Notice: Subject to any disclaimer, the term of this patent is extended or adjusted under 35 U.S.C. 154(b) by 0 days.

(21) Appl. No.: 15/630,444

(22) Filed: Jun. 22, 2017

(65) Prior Publication Data
US 2017/0303147 A1    Oct. 19, 2017

Related U.S. Application Data

(63) Continuation of application No. 15/169,100, filed on May 31, 2016, now Pat. No. 9,693,240.
(Continued)

(51) Int. Cl.
*H04L 7/02*     (2006.01)
*H04W 24/02*   (2009.01)
(Continued)

(52) U.S. Cl.
CPC .......... *H04W 24/02* (2013.01); *H04B 17/336* (2015.01); *H04L 5/005* (2013.01);
(Continued)

(58) Field of Classification Search
CPC .............. H04W 56/0035; H04W 24/02; H04B 17/336; H04L 7/02; H04L 5/005; H04L 27/265
See application file for complete search history.

(56) References Cited

U.S. PATENT DOCUMENTS

| 5,404,405 A | 4/1995 | Collier et al. |
| 5,719,898 A | 2/1998 | Davidovici et al. |

(Continued)

OTHER PUBLICATIONS

IEEE Standard for Information technology—Telecommunications and information exchange between systems—Local and metropolitan area networks—Specific requirements; Part 11: Wireless LAN Medium Access Control (MAC) and Physical Layer (PHY) Specifications, IEEE Std. 802.11-2012 (Mar. 29, 2012).
(Continued)

*Primary Examiner* — Jean B Corrielus
(74) *Attorney, Agent, or Firm* — Volpe and Koenig, P.C.

(57) ABSTRACT

Disclosed are embodiments of apparatuses and methods of use thereof for frequency domain (FD) chip level (CL) equalizers used in wireless receivers. The FD-CL-EQ may further selectively apply a higher order matrix inverse or a lower order matrix inverse in the calculation of a channel estimate based on whether interference is present or not. Further disclosed are embodiments of methods and apparatuses for estimating pilot signal-to-interference ratio (SIR) in the wireless receivers. Further disclosed are methods and apparatuses for compensating for phase errors in received demodulated data symbols to improve performance of the wireless receivers.

20 Claims, 15 Drawing Sheets

Related U.S. Application Data

(60) Provisional application No. 62/168,241, filed on May 29, 2015, provisional application No. 62/168,104, filed on May 29, 2015, provisional application No. 62/168,431, filed on May 29, 2015.

(51) Int. Cl.

| | | |
|---|---|---|
| *H04W 52/12* | (2009.01) | |
| *H04W 56/00* | (2009.01) | |
| *H04L 27/26* | (2006.01) | |
| *H04L 27/34* | (2006.01) | |
| *H04B 17/336* | (2015.01) | |
| *H04L 5/00* | (2006.01) | |

(52) U.S. Cl.
CPC .............. *H04L 7/02* (2013.01); *H04L 27/265* (2013.01); *H04L 27/3494* (2013.01); *H04W 52/12* (2013.01); *H04W 56/0035* (2013.01); H04M 2207/206 (2013.01)

(56) References Cited

U.S. PATENT DOCUMENTS

| | | | |
|---|---|---|---|
| 6,028,894 | A | 2/2000 | Oishi et al. |
| 7,085,311 | B2 | 8/2006 | Iwasaki |
| 7,173,990 | B2 | 2/2007 | Kim et al. |
| 7,298,802 | B2 | 11/2007 | Ren et al. |
| 7,336,742 | B2 * | 2/2008 | Ohseki ................ H04L 27/2657 375/260 |
| 7,443,827 | B2 | 10/2008 | Sano |
| 7,457,366 | B2 | 11/2008 | Maltsev et al. |
| 8,045,634 | B2 | 10/2011 | Zhang |
| 8,107,393 | B2 | 1/2012 | Vanganuru et al. |
| 8,577,304 | B2 | 11/2013 | Luschi et al. |
| 8,780,749 | B2 | 7/2014 | Vanganuru et al. |
| 8,982,866 | B1 | 3/2015 | Katzir et al. |
| 9,036,579 | B2 | 5/2015 | Anand et al. |
| 9,130,815 | B2 | 9/2015 | Weinholt et al. |
| 2002/0145971 | A1 * | 10/2002 | Cho .................... H04L 25/0204 370/208 |
| 2003/0072392 | A1 | 4/2003 | Beadle et al. |
| 2005/0078599 | A1 * | 4/2005 | Zhidkov ............. H04L 27/2679 370/210 |
| 2006/0114974 | A1 | 6/2006 | Zeira et al. |
| 2006/0133527 | A1 * | 6/2006 | Yu ........................ H04L 27/2662 375/260 |
| 2009/0213748 | A1 * | 8/2009 | Vanganuru ............. H04B 1/707 370/252 |
| 2010/0008346 | A1 * | 1/2010 | Shirakata ............ H04L 25/0228 370/343 |
| 2010/0303140 | A1 | 12/2010 | Tseng |
| 2011/0293032 | A1 * | 12/2011 | Azenkot ............... H03L 7/0807 375/285 |
| 2013/0195166 | A1 | 8/2013 | Reial |

OTHER PUBLICATIONS

Third Generation Partnership Project, "Technical Specification Group Radio Access Networks; User Equipment (UE) radio transmission and reception (FDD) (Release 1999)," 3GPP TS 25.101 V3.19.0 (Dec. 2006).

Third Generation Partnership Project, "Technical Specification Group Radio Access Networks; User Equipment (UE) radio transmission and reception (FDD) (Release 4)," 3GPP TS 25.101 V4.13.0 (Dec. 2006).

Third Generation Partnership Project, "Technical Specification Group Radio Access Network; User Equipment (UE) radio transmission and reception (FDD) (Release 5)," 3GPP TS 25.101 V5.20.0 (Dec. 2006).

Third Generation Partnership Project, "Technical Specification Group Radio Access Network; User Equipment (UE) radio transmission and reception (FDD) (Release 6)," 3GPP TS 25.101 V6.19.0 (Mar. 2009).

Third Generation Partnership Project, "Technical Specification Group Radio Access Network; User Equipment (UE) radio transmission and reception (FDD) (Release 7)," 3GPP TS 25.101 V7.18.0 (Sep. 2010).

Third Generation Partnership Project, "Technical Specification Group Radio Access Network; User Equipment (UE) radio transmission and reception (FDD) (Release 8)," 3GPP TS 25.101 V8.16.0 (Jun. 2012).

Third Generation Partnership Project, "Technical Specification Group Radio Access Network; User Equipment (UE) radio transmission and reception (FDD) (Release 8)," 3GPP TS 25.101 V8.17.0 (Mar. 2016).

Third Generation Partnership Project, "Technical Specification Group Radio Access Network; User Equipment (UE) radio transmission and reception (FDD) (Release 9)," 3GPP TS 25.101 V9.13.0 (Sep. 2013).

Third Generation Partnership Project, "Technical Specification Group Radio Access Network; User Equipment (UE) radio transmission and reception (FDD) (Release 9)," 3GPP TS 25.101 V9.14.0 (Mar. 2016).

Third Generation Partnership Project, "Technical Specification Group Radio Access Network; User Equipment (UE) radio transmission and reception (FDD) (Release 10)," 3GPP TS 25.101 V10.13.0 (Dec. 2014).

Third Generation Partnership Project, "Technical Specification Group Radio Access Network; User Equipment (UE) radio transmission and reception (FDD) (Release 10)," 3GPP TS 25.101 V10.14.0 (Mar. 2016).

Third Generation Partnership Project, "Technical Specification Group Radio Access Network; User Equipment (UE) radio transmission and reception (FDD) (Release 11)," 3GPP TS 25.101 V11.11.0 (Dec. 2014).

Third Generation Partnership Project, "Technical Specification Group Radio Access Network; User Equipment (UE) radio transmission and reception (FDD) (Release 11)," 3GPP TS 25.101 V11.13.0 (Mar. 2016).

Third Generation Partnership Project, "Technical Specification Group Radio Access Network; User Equipment (UE) radio transmission and reception (FDD) (Release 12)," 3GPP TS 25.101 V12.7.0 (Mar. 2015).

Third Generation Partnership Project, "Technical Specification Group Radio Access Network; User Equipment (UE) radio transmission and reception (FDD) (Release 12)," 3GPP TS 25.101 V12.10.0 (Mar. 2016).

Third Generation Partnership Project, "Technical Specification Group Radio Access Network; User Equipment (UE) radio transmission and reception (FDD) (Release 13)," 3GPP TS 25.101 V13.2.1 (May 2016).

* cited by examiner

METHODS AND APPARATUSES FOR ADVANCED RECEIVER DESIGN

CROSS REFERENCE TO RELATED APPLICATIONS

This application is a continuation of U.S. patent application Ser. No. 15/169,100 filed on May 31, 2016, now U.S. Pat. No. 9,693,240, which claims the benefit of U.S. Provisional Patent Application No. 62/168,241 filed on May 29, 2015, U.S. Provisional Patent Application No. 62/168,104 filed on May 29, 2015, and U.S. Provisional Patent Application No. 62/168,431 filed on May 29, 2015, the contents of which are hereby incorporated by reference herein.

BACKGROUND

Wideband Code Division Multiple Access (WCDMA) based Evolved High Speed Packet Access (HSPA+), Orthogonal Frequency Division Multiplexing (OFDM) based Long Term Evolution/Long Term Evolution Advanced (LTE/LTE-A), and OFDM based IEEE 802.11 systems may employ higher order modulation schemes in order to achieve high data rates. In 64-quadrature amplitude modulation (64QAM) applications, chip level equalizers may be employed to mitigate channel multipath and cancel interference.

A signal to noise and interference ratio (SINR) is a quantity used to give theoretical upper bounds of channel capacity, or the rate of information transfer, in wireless communication systems. The SINR is defined as the power of a certain signal of interest divided by the sum of the interference power from all the other interfering signals and the power of some background noise. If the power of background noise term is zero, then the SINR reduces to the signal-to-interference ratio (SIR). SINR measurements are made for various purposes, such as, for example, estimation of Channel Quality Indicator (CQI) and quality measurements for the maximum-ratio combining (MRC) of retransmissions, and are important for the operation of wireless transmit/receive units (WRTUs) and network nodes.

In 64QAM applications, the constellation points may be closely spaced and have a very small angular separation. In receiver design, it may be necessary to match filter delay through channel estimation with an equivalent delay in the signal to be processed in the receiver to avoid phase errors in the demodulated symbols.

SUMMARY

Disclosed herein are embodiments of a frequency domain (FD) chip level (CL) equalizer (EQ) and method of use thereof. Channel estimation (CHEST) information may be transformed into FD by, for example, a fast Fourier transform (FFT). A synchronization channel (SCH) sequence may also be transformed into FD by an FFT. The FD CHEST information and FD SCH sequence may be multiplied to form an estimated FD received SCH. The estimated received SCH may be subtracted from FD received chip data to generate received chip data with SCH cancellation. Equalizer data output may then be generated based on the received chip data with SCH cancellation and the FD chest information. The FD-CL-EQ may further be configured to selectably enable a lower order matrix inverse or higher order matrix inverse based on the presence, or lack thereof, of interference. Furthermore, a universal FD-CL-EQ design may implemented for supporting Type 3I receiver requirements which generates an equalization matrix $G_k$ using a covariance matrix structure based on the interference.

Further disclosed herein are embodiments of a receiver capable of pilot signal-to-interference ratio (SIR) estimation and a method of use thereof. The receiver may include a demultiplexer that is configured to extract a real part of a demodulated pilot symbol, where a pilot signal power is estimated based on the power of the real part of the demodulated pilot symbol. The receiver may further include a summing unit which may subtract a delayed version of the demodulated pilot symbol from the demodulated pilot symbol to generate a differential demodulated pilot symbol. A pilot noise power may be estimated based on the differential demodulated pilot symbol. The receiver may further include a unit configured to estimate the pilot SIR by dividing the power based on the real part of the demodulated pilot symbol by the power based on the differential demodulated pilot symbol.

Further disclosed herein are embodiments of a receiver and method of use thereof, wherein the receiver may be capable of compensating for phase error. The receiver may be configured to low-pass filter a complex demodulated pilot symbol. The receiver may be further configured to generate a complex conjugate of the complex demodulated pilot symbol. The receiver may be further configured to generate a scaled magnitude of the complex demodulated pilot symbol. The magnitude of the complex demodulated pilot symbol may be approximated as the magnitude of the real part of the complex demodulated pilot symbol. The receiver may be further configured to generate a phase correction to apply to received complex demodulated data symbols by dividing the complex conjugate of the complex demodulated pilot symbol by the scaled magnitude of the complex demodulated pilot symbol.

BRIEF DESCRIPTION OF THE DRAWINGS

A more detailed understanding may be had from the following description, given by way of example in conjunction with the accompanying drawings wherein.

DETAILED DESCRIPTION

Figure 1A:
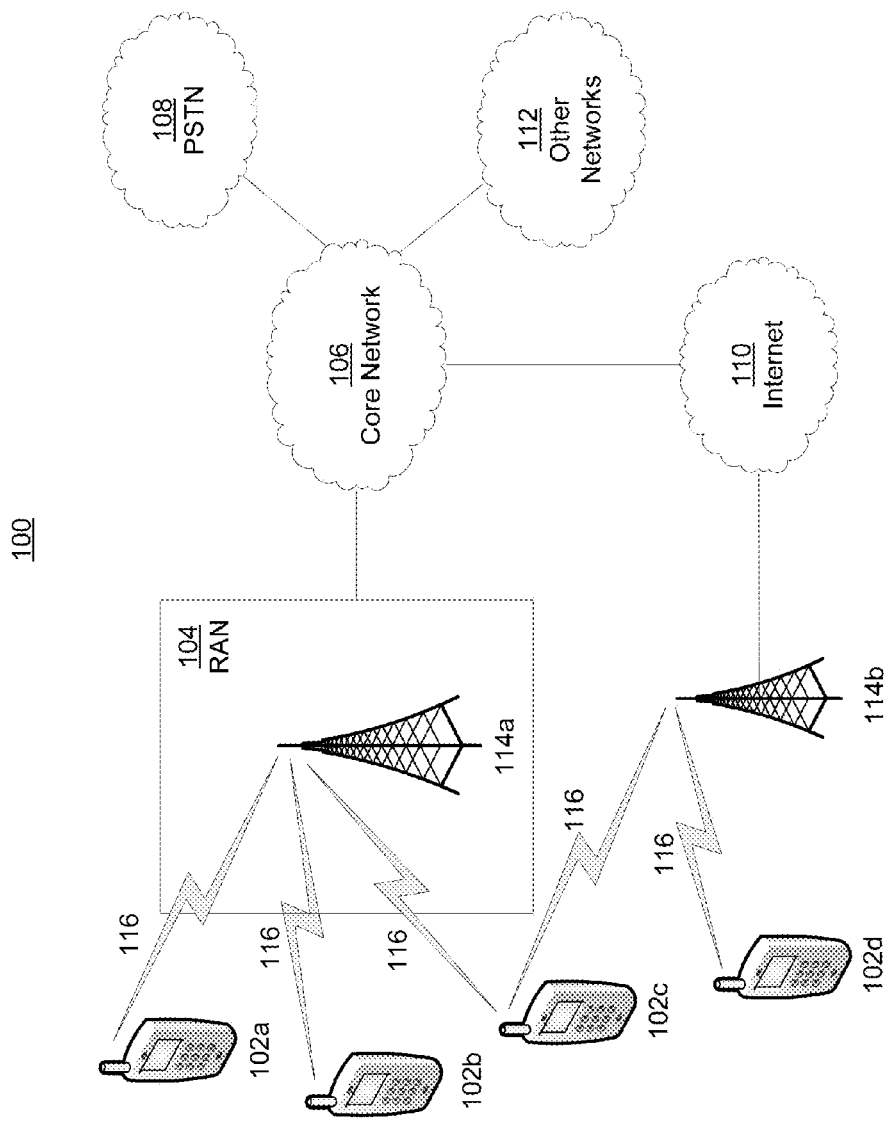
FIG. 1A is a system diagram of an example communications system in which one or more disclosed embodiments may be implemented.

FIG. 1A is a diagram of an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 1A, the communications system 100 may include wireless transmit/receive units (WTRUs) 102a, 102b, 102c, 102d, a radio access network (RAN) 104, a core network 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, and the like.

The communications systems 100 may also include a base station 114a and a base station 114b. Each of the base stations 114a, 114b may be any type of device configured to wirelessly interface with at least one of the WTRUs 102a, 102b, 102c, 102d to facilitate access to one or more communication networks, such as the core network 106, the Internet 110, and/or the other networks 112. By way of example, the base stations 114a, 114b may be a base transceiver station (BTS), a Node-B, an eNode B, a Home Node B, a Home eNode B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104, which may also include other base stations and/or network elements (not shown), such as a base station controller (BSC), a radio network controller (RNC), relay nodes, etc. The base station 114a and/or the base station 114b may be configured to transmit and/or receive wireless signals within a particular geographic region, which may be referred to as a cell (not shown). The cell may further be divided into cell sectors. For example, the cell associated with the base station 114a may be divided into three sectors. Thus, in one embodiment, the base station 114a may include three transceivers, i.e., one for each sector of the cell. In another embodiment, the base station 114a may employ multiple-input multiple-output (MIMO) technology and, therefore, may utilize multiple transceivers for each sector of the cell.

The base stations 114a, 114b may communicate with one or more of the WTRUs 102a, 102b, 102c, 102d over an air interface 116, which may be any suitable wireless communication link (e.g., radio frequency (RF), microwave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104 and the WTRUs 102a, 102b, 102c may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A).

In other embodiments, the base station 114a and the WTRUs 102a, 102b, 102c may implement radio technologies such as IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, and the like. In one embodiment, the base station 114b and the WTRUs 102c, 102d may implement a radio technology such as IEEE 802.11 to establish a wireless local area network (WLAN). In another embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, etc.) to establish a picocell or femtocell. As shown in FIG. 1A, the base station 114b may have a direct connection to the Internet 110. Thus, the base station 114b may not be required to access the Internet 110 via the core network 106.

The RAN 104 may be in communication with the core network 106, which may be any type of network configured to provide voice, data, applications, and/or voice over internet protocol (VoIP) services to one or more of the WTRUs 102a, 102b, 102c, 102d. For example, the core network 106 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104 and/or the core network 106 may be in direct or indirect communication with other RANs that employ the same RAT as the RAN 104 or a different RAT. For example, in addition to being connected to the RAN 104, which may be utilizing an E-UTRA radio technology, the core network 106 may also be in communication with another RAN (not shown) employing a GSM radio technology.

The core network 106 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 104 or a different RAT.

Some or all of the WTRUs 102a, 102b, 102c, 102d in the communications system 100 may include multi-mode capabilities, i.e., the WTRUs 102a, 102b, 102c, 102d may include multiple transceivers for communicating with different wireless networks over different wireless links. For example, the WTRU 102c shown in FIG. 1A may be configured to communicate with the base station 114a, which may employ a cellular-based radio technology, and with the base station 114b, which may employ an IEEE 802 radio technology.

Figure 1B:
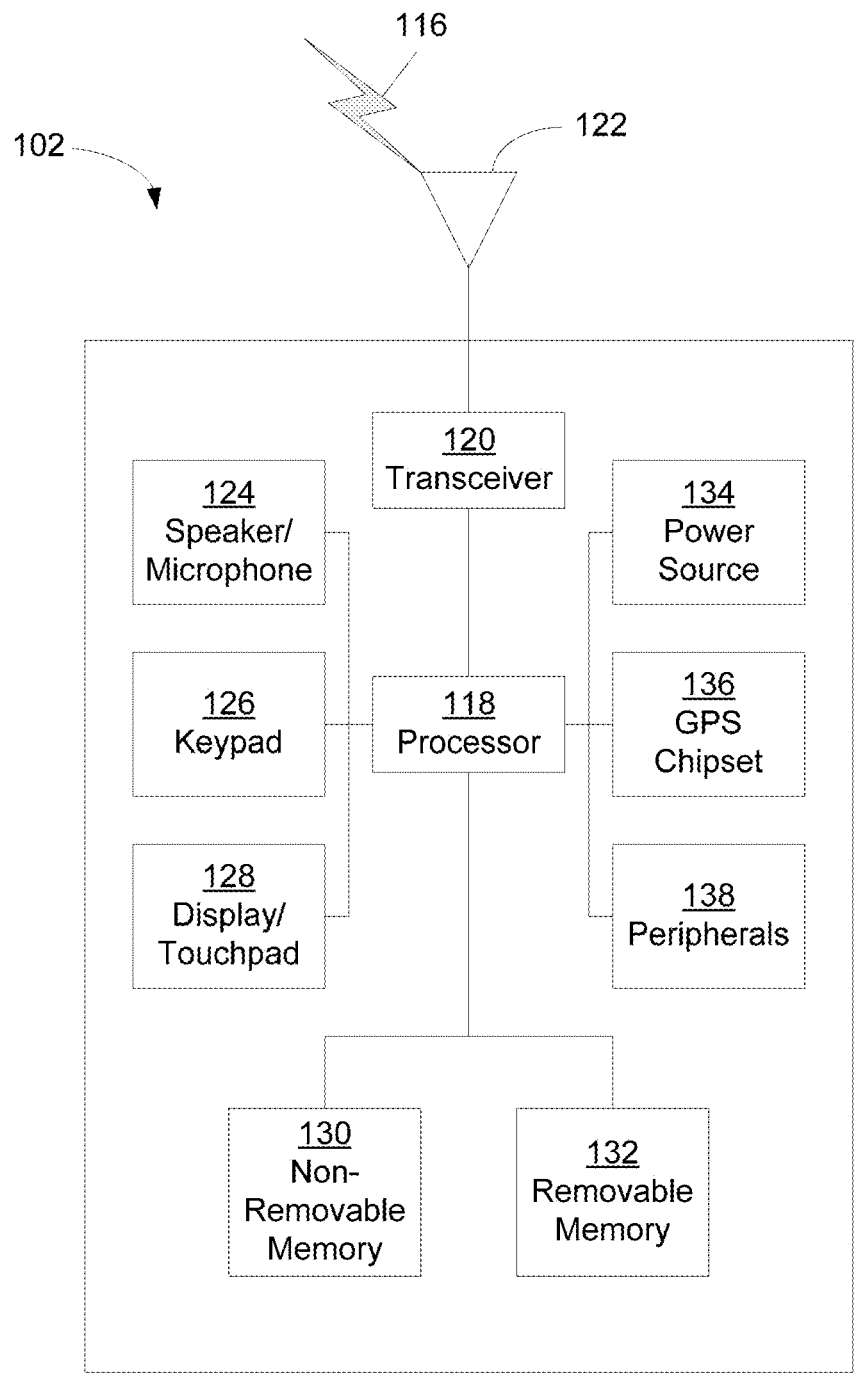
FIG. 1B is a system diagram of an example wireless transmit/receive unit (WTRU) that may be used within the communications system illustrated in FIG. 1A.

FIG. 1B is a system diagram of an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and other peripherals 138. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In another embodiment, the transmit/receive element 122 may be an emitter/detector configured to transmit and/or receive IR, UV, or visible light signals, for example. In yet another embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 1C:
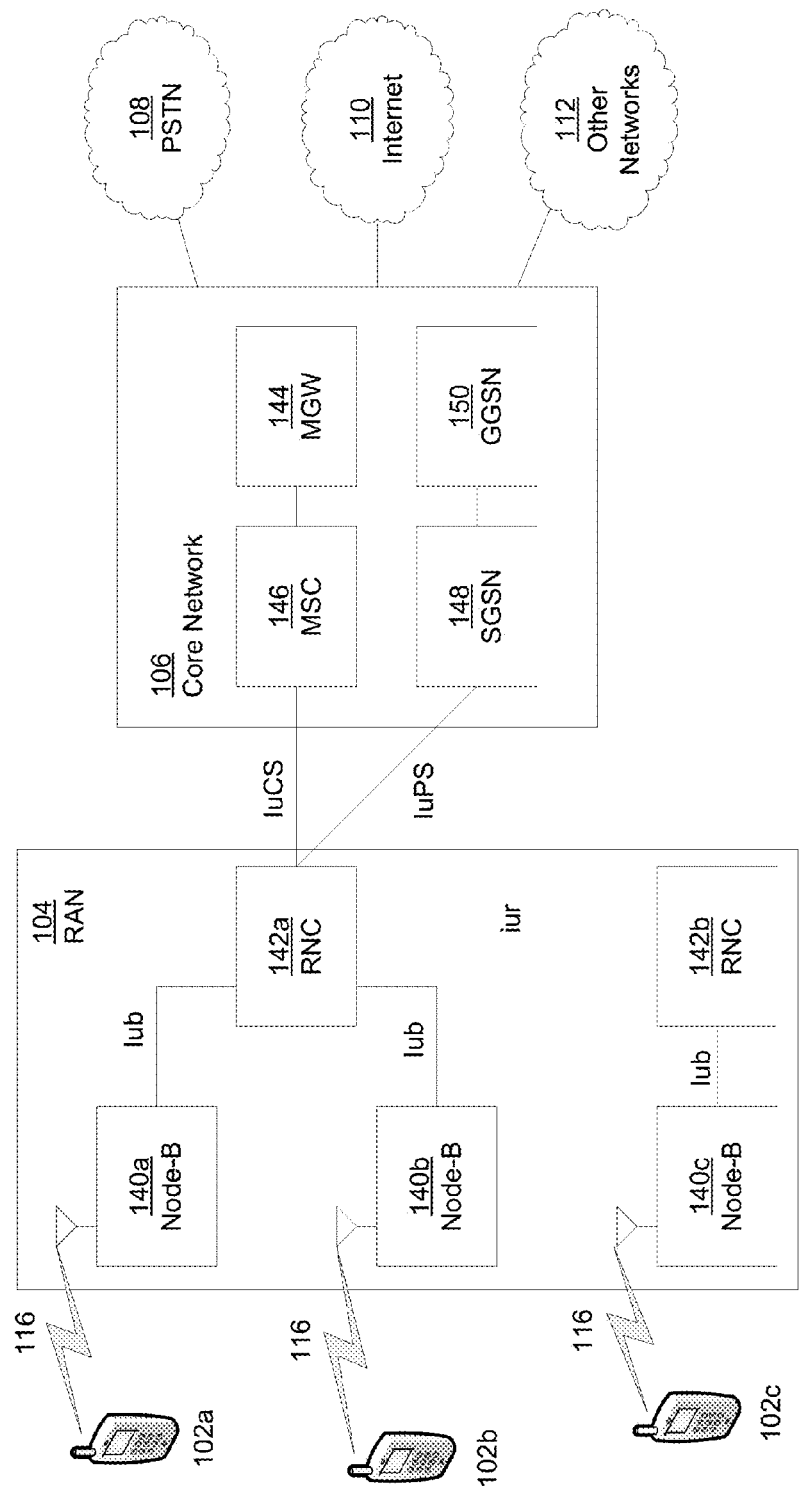
FIG. 1C is a system diagram of an example radio access network and an example core network that may be used within the communications system illustrated in FIG. 1A.

FIG. 1C is a system diagram of the RAN 104 and the core network 106 according to an embodiment. As noted above, the RAN 104 may employ a UTRA radio technology to communicate with the WTRUs 102a, 102b, 102c over the air interface 116. The RAN 104 may also be in communication with the core network 106. As shown in FIG. 1C, the RAN 104 may include Node-Bs 140a, 140b, 140c, which may each include one or more transceivers for communicating with the WTRUs 102a, 102b, 102c over the air interface 116. The Node-Bs 140a, 140b, 140c may each be associated with a particular cell (not shown) within the RAN 104. The RAN 104 may also include RNCs 142a, 142b. It will be appreciated that the RAN 104 may include any number of Node-Bs and RNCs while remaining consistent with an embodiment.

As shown in FIG. 1C, the Node-Bs 140a, 140b may be in communication with the RNC 142a. Additionally, the Node-B 140c may be in communication with the RNC 142b. The Node-Bs 140a, 140b, 140c may communicate with the respective RNCs 142a, 142b via an Iub interface. The RNCs 142a, 142b may be in communication with one another via an Iur interface. Each of the RNCs 142a, 142b may be configured to control the respective Node-Bs 140a, 140b, 140c to which it is connected. In addition, each of the RNCs 142a, 142b may be configured to carry out or support other functionality, such as outer loop power control, load control, admission control, packet scheduling, handover control, macrodiversity, security functions, data encryption, and the like.

The core network 106 shown in FIG. 1C may include a media gateway (MGW) 144, a mobile switching center (MSC) 146, a serving GPRS support node (SGSN) 148, and/or a gateway GPRS support node (GGSN) 150. While each of the foregoing elements are depicted as part of the core network 106, it will be appreciated that any one of these elements may be owned and/or operated by an entity other than the core network operator.

The RNC 142a in the RAN 104 may be connected to the MSC 146 in the core network 106 via an IuCS interface. The MSC 146 may be connected to the MGW 144. The MSC 146 and the MGW 144 may provide the WTRUs 102a, 102b, 102c with access to circuit-switched networks, such as the PSTN 108, to facilitate communications between the WTRUs 102a, 102b, 102c and traditional land-line communications devices.

The RNC 142a in the RAN 104 may also be connected to the SGSN 148 in the core network 106 via an IuPS interface. The SGSN 148 may be connected to the GGSN 150. The SGSN 148 and the GGSN 150 may provide the WTRUs 102a, 102b, 102c with access to packet-switched networks, such as the Internet 110, to facilitate communications between and the WTRUs 102a, 102b, 102c and IP-enabled devices.

As noted above, the core network 106 may also be connected to the networks 112, which may include other wired or wireless networks that are owned and/or operated by other service providers.

Figure 1D:
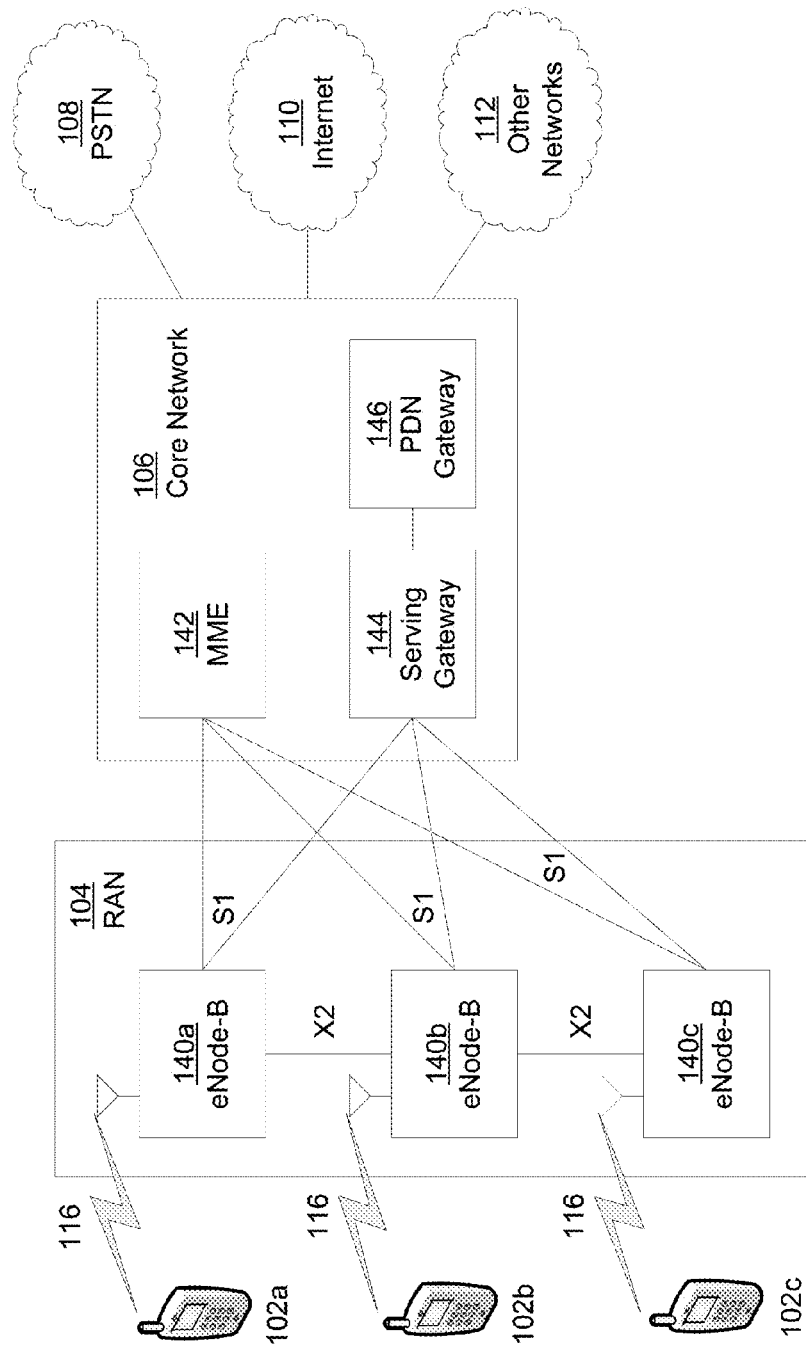
FIG. 1D is another system diagram of another example radio access network and another example core network that may be used within the communications system illustrated in FIG. 1A.

FIG. 1D is a system diagram of the RAN 104 and the core network 106 according to an embodiment. As noted above, the RAN 104 may employ an E-UTRA radio technology to communicate with the WTRUs 102a, 102b, 102c over the air interface 116. The RAN 104 may also be in communication with the core network 106.

The RAN 104 may include eNode-Bs 140a, 140b, 140c, though it will be appreciated that the RAN 104 may include any number of eNode-Bs while remaining consistent with an embodiment. The eNode-Bs 140a, 140b, 140c may each include one or more transceivers for communicating with the WTRUs 102a, 102b, 102c over the air interface 116. In one embodiment, the eNode-Bs 140a, 140b, 140c may implement MIMO technology. Thus, the eNode-B 140a, for example, may use multiple antennas to transmit wireless signals to, and receive wireless signals from, the WTRU 102a.

Each of the eNode-Bs 140a, 140b, 140c may be associated with a particular cell (not shown) and may be configured to handle radio resource management decisions, handover decisions, scheduling of users in the uplink and/or downlink, and the like. As shown in FIG. 1C, the eNode-Bs 140a, 140b, 140c may communicate with one another over an X2 interface.

The core network 106 shown in FIG. 1D may include a mobility management entity gateway (MME) 142, a serving gateway 144, and a packet data network (PDN) gateway 146. While each of the foregoing elements are depicted as part of the core network 106, it will be appreciated that any one of these elements may be owned and/or operated by an entity other than the core network operator.

The MME 142 may be connected to each of the eNode-Bs 140a, 140b, 140c in the RAN 104 via an S1 interface and may serve as a control node. For example, the MME 142 may be responsible for authenticating users of the WTRUs 102a, 102b, 102c, bearer activation/deactivation, selecting a particular serving gateway during an initial attach of the WTRUs 102a, 102b, 102c, and the like. The MME 142 may also provide a control plane function for switching between the RAN 104 and other RANs (not shown) that employ other radio technologies, such as GSM or WCDMA.

The serving gateway 144 may be connected to each of the eNode Bs 140a, 140b, 140c in the RAN 104 via the S1 interface. The serving gateway 144 may generally route and forward user data packets to/from the WTRUs 102a, 102b, 102c. The serving gateway 144 may also perform other functions, such as anchoring user planes during inter-eNode B handovers, triggering paging when downlink data is available for the WTRUs 102a, 102b, 102c, managing and storing contexts of the WTRUs 102a, 102b, 102c, and the like.

The serving gateway 144 may also be connected to the PDN gateway 146, which may provide the WTRUs 102a, 102b, 102c with access to packet-switched networks, such as the Internet 110, to facilitate communications between the WTRUs 102a, 102b, 102c and IP-enabled devices.

The core network 106 may facilitate communications with other networks. For example, the core network 106 may provide the WTRUs 102a, 102b, 102c with access to circuit-switched networks, such as the PSTN 108, to facilitate communications between the WTRUs 102a, 102b, 102c and traditional land-line communications devices. For example, the core network 106 may include, or may communicate with, an IP gateway (e.g., an IP multimedia subsystem (IMS) server) that serves as an interface between the core network 106 and the PSTN 108. In addition, the core network 106 may provide the WTRUs 102a, 102b, 102c with access to the networks 112, which may include other wired or wireless networks that are owned and/or operated by other service providers.

Other network 112 may further be connected to an IEEE 802.11 based wireless local area network (WLAN) 160. The WLAN 160 may include an access router 165. The access router may contain gateway functionality. The access router 165 may be in communication with a plurality of access points (APs) 170a, 170b. The communication between access router 165 and APs 170a, 170b may be via wired Ethernet (IEEE 802.3 standards), or any type of wireless communication protocol. AP 170a is in wireless communication over an air interface with WTRU 102d.

Evolved High-speed Downlink Packet Access (HSDPA+) has been developed to enhance current WCDMA systems and provide a higher data rate for mobile users. To ensure a downlink speed of up to downlink (DL) 42 Mbps, HSDPA+ has adopted three main features including adaptive modulation and coding, a hybrid automatic repeat request, and fast scheduling.

A typical HSDPA+ receiver generally may use a rake architecture. Rake receivers may combine multi-path components in order to improve the signal-to-noise ratio at the receiver. Rake receivers may not be generally known for reducing multiple access interference (MAI) and/or inter-path interference (IPI). Further, the performance of a rake receiver may be degraded when the number of mobile users in the system increases or when operating in conditions that are not line-of-sight. Conversely, a chip equalizer may alleviate the MAI and IPI significantly at the expense of complexity and may, therefore, be an alternative solution for a rake receiver in a HSDPA+ system.

In an embodiment, disclosed herein, a novel chip level equalizer design may be capable of suppressing MAI and also restoring the orthogonality of codes, which may reduce IPI.

A WTRU may be categorized as including a receiver of one of the following types with associated capability:

Type 1: Receive diversity
Type 2: Linear minimum mean square error (LMMSE) chip-level equalizer
Type 3: Receive diversity+LMMSE equalizer
Type 3I: Receive diversity+interference-aware LMMSE equalizer The embodiments of WTRUs disclosed herein may include receivers of Type 3I advanced receiver design, i.e., interference-aware chip-level equalizer and receive diversity receiver design.

A chip level equalizer (CL-EQ) may be beneficial in WCDMA systems and may be well-suited for higher data rate HSPA+ systems because it not only may restore channel orthogonality due to a multipath effect but it may also perform mitigation for MAI. In addition, low complexity and fast adaptation to time varying channel coefficients may be important receiver design criteria in HSPA+ systems as well.

An approximate linear minimum mean square error (LMMSE) equalizer is an alternative solution to an adaptive least means squared (LMS) receiver for the WCDMA downlink. A LMMSE chip level equalizer may have improved performance over a conventional rake receiver and a zero forcing equalizer. However, a drawback of the MMSE chip level equalizer may include higher computational complexity due to matrix inversion. Also, adaptive LMS equalizers may converge slowly and may experience poor tracking performance in fast fading channels. As a consequence, a frequency-domain (FD) CL EQ may be well-suited for an HSPA+ EQ design choice because it reduces the matrix inverse size which reduces the computation complexity. Also, unlike adaptive implementations of LMS for CL-EQ, an FD-CL-EQ may not rely on a convergence rate to obtain channel equalization.

HSPA+ features high data rates for packet data services. To achieve higher data rates in an HSPA+ system, a higher modulation scheme such as 64 QAM may be used. However, these higher modulation schemes may be more sensitive to interference, such as interference from the synchronization channel (SCH). This may be due to the SCH not being orthogonal to data codes and the SCH power can be proportionally larger than the per-code power used for the high-speed physical downlink shared channel (HS-PDSCH). To minimize the SCH interference and enhance the throughput, SCH interference may be cancelled in the data equalization stage. An FD chip equalizer may use a fast Fourier transform (FFT) operation to transform time-domain (TD) chip data into the FD. In addition, the channel estimation (CHEST) information may be transformed from the TD into the FD.

Figure 2:
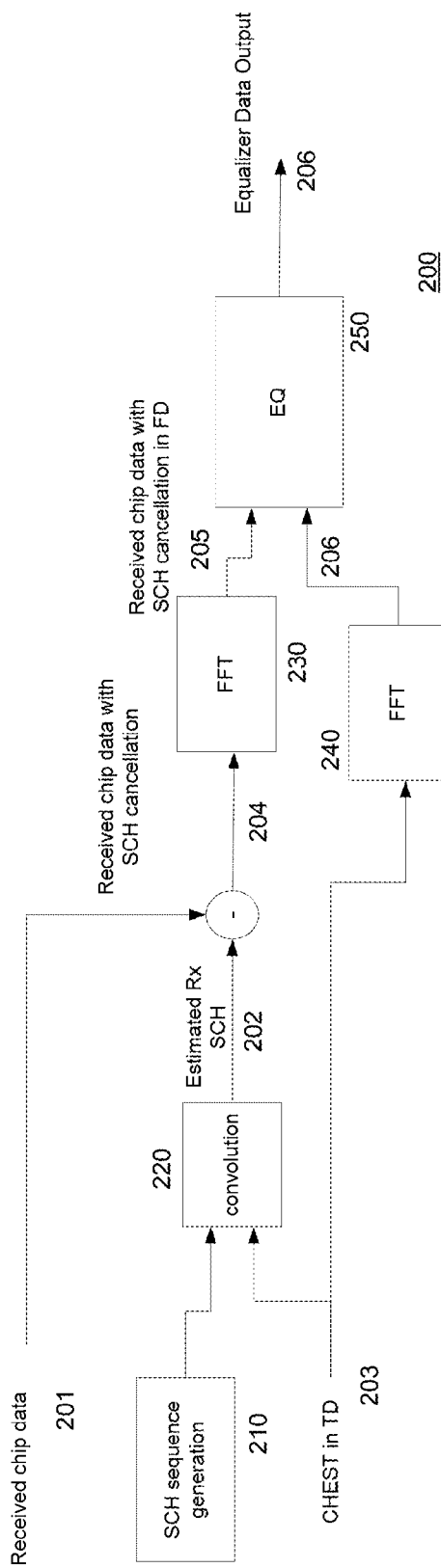
FIG. 2 is a diagram of an embodiment of a shared channel (SCH) canceller based on time domain (TD) cancellation.

FIG. 2 is a block diagram of a SCH canceller 200 based on TD for HSPA+ CL-EQ. SCH sequence generation 210 and CHEST information in TD 203 may be convolved by convolution block 220 into an estimated received SCH 202. The estimated received SCH 202 may be subtracted from the received chip data 201 to generate received chip data with SCH cancellation 204. The received chip data with SCH cancellation 204 may be transformed from TD by FFT 230 to generate received chip data with SCH cancellation in FD 205. CHEST information in TD 203 may also be transformed from TD by FFT 240 to generate CHEST in FD 206. Received chip data with SCH cancellation in FD 205 and CHEST in FD 206 may be then be input into equalizer 250 to then generate equalizer data output 206.

If SCH cancellation is implemented in the TD, then data equalizer 250 waits until SCH cancellation is done in the TD before performing FD data equalization. SCH cancellation based on TD may cause a larger latency for equalization processing and may consume higher complexity.

Embodiments of methods and apparatuses for frequency domain chip level EQ (FD-CL-EQ) are disclosed herein. Embodiments include adaptive data covariance matrix estimation for MMSE based on FD-CL-EQ, a universal FD-CL-EQ design for supporting Type 3I, and a low power FD-CL-EQ design for supporting Type 3I.

By contrast to the TD SCH cancellation method, SCH cancellation in a chip equalizer (CE) is feasible in the FD. An FD-SCH cancellation method may provide a number of advantages over a TD convolution-based SCH signal cancellation method. For example, a TD convolution operation for SCH cancellation before the data equalization may not be needed. Further, a convolution circuit may require more computational effort than FFT-based convolution. Because the FD CHEST information may be applied to both SCH cancellation and FD chip-level data equalization, FFT operation may be reused. The complexity and processing time latency associated with a FD-CL-EQ may be further reduced because the SCH cancellation state simultaneously co-exists in the data equalizer, enabling a joint SCH canceller with data equalization. An enhanced estimation for the received SCH in FD may also be provided over the TD implementation because the TD implementation may be based on truncated information. In a TD implementation, the received SCH estimation is dependent on the outcome of CHEST TD information convolved with the generated SCH sequence. When TD CHEST information is large or contains many taps, the computation of convolution may be heavy and, as a result, may need to be reduced through a time-based truncation of the TD CHEST information. This truncation may limit the estimation accuracy for received SCH cancellation.

Embodiments of a new class of HSPA+ CL-EQ based on FD MMSE with adaptive data covariance estimation are disclosed herein. In an embodiment, data covariance estimation may be adaptive to the number of multicodes that are assigned to a user. The number of multicodes may be prior information before detection and demodulation. In this embodiment, the data covariance can be estimated more accurately in the CL-EQ, hence, performance is enhanced. Disclosed herein are embodiments of a new HSPA+ CL-EQ based on regular and alternative MMSE formulation. Because scaling may be involved in the EQ filter coefficient calculation, the adaptive data covariance estimation operation may be less complex.

In the embodiments described herein, $N_r$ denotes the number of receive antennas and $N_t$ denotes the number of transmit antennas.

Regular MMSE formulation for FD-CL-EQ is described herein. For simplicity and without losing the generality, the receive HSPA FD data is denoted $y_k$: at a subcarrier $k=1, \ldots, K$ wherein K denotes the FFT size, with a single code 0 (user) is given by Equation 1.

$$y_k = H_{0,k} w_0 d_{0,k} + v_k + n_k, \quad \text{(Equation 1)}$$

wherein $v_k$ denotes the intra-code interference $$v_k = \sum_{u=1}^{U} H_{u,k} w_u d_{u,k},$$

$H_{u,k}$ is the channel matrix at a subcarrier k on code u, $d_k$ denotes the transmit data (a scalar) in this case, $w_u$: closed-loop transmit diversity (CLTD) weight, or alternatively precoding weight, vector for code u and $n_k$ is the noise vector at a subcarrier k.

An MMSE receiver operation may be written as:

$$G_{reg,k} = H_{eff,0,k}(H_{0,k} R_x H_{0,k}^H + R_n)^{-1}, \quad \text{(Equation 2)}$$

wherein $$R_x = \begin{cases} 1, & \text{Else} \\ (1-\alpha) w_0 w_0^H + \alpha I, & \text{CLTD} \end{cases}$$

CLTD is the data covariance matrix with matrix size $N_t \times N_t$ when MIMO is enabled or is equal to a scalar in the non-MIMO case. The parameter $\alpha$ may represent the sum of the transmit data covariance and intra-codes data covariance matrix. In addition, $\alpha$ value may be a function of the power of the multicodes assigned for user 0 in a cell. $H_{eff,0,k} = H_{0,k} w_0$ may express the effective channel at subcarrier k. $R_n$ may represent the noise covariance matrix.

In another embodiment, an alternative MMSE formulation for FD-CL-EQ may be used. The MMSE formulation shown in Equation 2 involves a 4×4 matrix inverse when oversampling by a factor of 2 in the FD-CL-EQ. An alternative MMSE formulation may be used in order to avoid computation of a higher dimension matrix inverse. By computing the matrix inversion lemma, equation 3 may be used in addition to or as an alternative to equation 2.

$$G_{alt,k} = w_0^H[R_x H_{0,k}^H (H_{0,k} R_x H_{0,k}^H + R_n)^{-1}] = w_0^H (R_x^{-1} + H_{0,k}^H R_n^{-1} H_{0,k})^{-1} H_{0,k}^H R_n^{-1} \quad \text{(Equation 3)}$$

This formulation provides an option to use $\alpha$, introduced in Equation 2 for calculating $R_x$, as a parameter to tune the receiver performance. Additionally or alternatively, $\alpha$ may be a constant value (e.g. 0.5) and may not be tuned. For low SNR and mid-range SNR, a constant setting of $\alpha=0.5$ may work practically as well as a tuned value. However, an inaccurate value of $\alpha$ may cause up to a 2 dB loss in high modulation and coding scheme (MCS), high SNR cases in the receiver. In the receiver, one way to estimate $\alpha$ may be to make it a function of the number of codes allotted to the WTRU of interest. Another embodiment in addition or in combination may estimate the proportion of the transmitted base station power used for the desired codes.

This formulation allows for relatively relaxed fixed point requirements when dealing with a matrix inversion of $R_{i+n,k}$ because it may be diagonally loaded with a relatively large factor. This is unlike prior designs which may use a regular formulation where the requirements on the inverse may necessitate a block-floating point design.

The formulation of Equation 3 may also be implemented in a way in which a precoding weight may be applied through $H_{eff,0,k}$ when calculating $G_{reg,k}$. This may cause the multiple streams for CLTD to be combined through the precoding at the chip level. Thereby only a single stream may be available at the output of the MMSE stage—so only a single stream may be converted back to the TD and despread. This may be unlike prior designs where the precoder weight may be applied as a separate step after equalization and separate time domain transformations may be performed on the streams. The streams may then be despread prior to being combined.

The equalization matrix $G_k$ may be computed at a rate lower than the subcarrier rate and simply interpolated to the subcarrier rate in order to simplify the implementation.

Embodiments of a FD-CL-EQ for Type 3I are also disclosed herein. For a Type 3I receiver, the noise covariance matrix $R_n$ of Equation 2 or Equation 3 may be replaced by a noise plus interference covariance matrix denoted as $R_{i+n,k}$. This is because the serving cell chip data may be assumed to be uncorrelated with the interference chip data. The noise plus interference covariance matrix may be denoted as:

$$R_{i+n,k} = \sum_{j \neq 0}^{N} H_{j,k} H_{j,k}^H + R_n \quad \text{(Equation 4)}$$

where $H_{j,k}$ is the channel matrix of interference cell $0 < j \leq N$ and N is the number of interference cells detected by the receiver where $N \geq 1$. If no interference cell is detected, (N=0), $R_{i+n,k}$ may be equal to $R_n$.

For example, the alternative MMSE equation shown in Equation 3 for a Type 3I receiver may be modified as:

$$G_{altr,k} = w_0^H (R_x^{-1} + H_{0,k}^H R_{i+n,k}^{-1} H_{0,k})^{-1} H_{0,k}^H R_{i+n,k}^{-1} \quad \text{(Equation 5)}$$

When an interferer is detected, the noise plus interference covariance matrix may vary at each subcarrier. Therefore, the noise plus interference covariance matrix may need to be calculated for each subcarrier.

Figure 3:
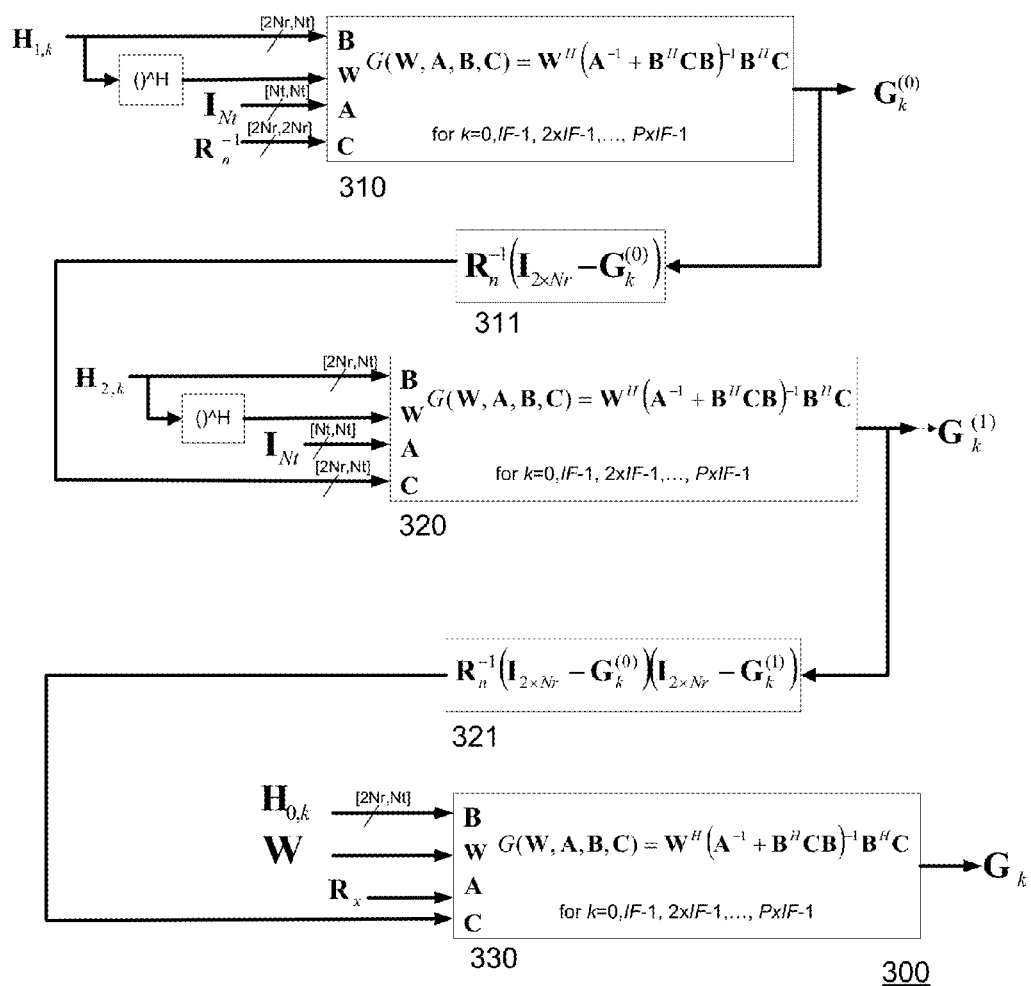
FIG. 3 is a diagram of an example embodiment of a universal frequency division chip level equalizer (FD-CL-EQ) design for supporting Type 3I receiver requirements.

FIG. 3 depicts an example embodiment of a universal FD-CL-EQ design for supporting Type 3I receiver requirements. FIG. 3 depicts a functional representation of the calculations involved in generating the equalization matrix $G_k$ in this example embodiment. A universal CL-EQ for Type 3I receiver based on an alternative MMSE formulation function may be implemented since the interference covariance matrix has a certain matrix inverse structure in the Type 3I case. In this case, only a single MMSE formulation or MMSE engine may be needed to handle a number of different interference cells. As such, the disclosed CL-EQ for Type 3I receiver is a flexible architecture. A universal CL-EQ module operation may be defined in the following formulation:

$$G(W, A, B, C) = W^H (A^{-1} + B^H C B)^{-1} B^H C \quad \text{(Equation 6)}$$

FIG. 3 includes three stages 310, 320, and 330 corresponding to the calculation of Equation 6 for the inputs as depicted. The input parameters corresponding to the matrices listed in Equation 6 and as shown in FIG. 3 are listed in the following Table 1. There may be, for example, two intermediate results, $G_k^{(0)}$ and $G_k^{(1)}$, depending on a number of interferers detected. Table 1 list the input parameters as depicted in FIG. 3 for calculating the intermediate stages outputting $G_k^{(0)}$ and $G_k^{(1)}$.

TABLE 1

Intermediate stages for Noise with Interference covariance matrix calculation for Type 3I

| Universal MMSE coefficient Formulation G (W, A, B, C) | Input Matrix W | Input Matrix A | Input Matrix B | Input Matrix C |
|---|---|---|---|---|
| Single interference intermediate result $G_k^{(0)}$ | $W = B^H$ | $A = I_{2\times 2}$ | $B = H_{1,k}$ | $C = R_n^{-1}$ |
| Two interferences intermediate result $G_k^{(1)}$ | $W = B^H$ | $A = I_{2\times 2}$ | $B = H_{2,k}$ | $C = R_n^{-1} (I_{4\times 4} - G_k^{(0)})$ |

As depicted in FIG. 3, intermediate result $G_k^{(0)}$ may be input into calculation unit 311, and the result may be used as the input C for calculation unit 320. As further depicted, the intermediate result $G_k^{(1)}$ may be input into calculation unit 321, and the result may be used as the input C for calculation unit 330. Though the stages 310, 320, and 330 are shown as separate units, they may be a single calculation unit with the appropriate values input to the calculation unit as depicted in FIG. 3 and shown in Table 1.

The equalization matrix $G_k$ is output from the final stage 330. FIG. 3 depicts the calculations for an embodiment of a universal FD-CL-EQ design for supporting Type 3I receiver requirements in the case of two interferences. The input parameters for the final stage 330 are listed in the following Table 2 for the cases of no interference, a single interference, and two interferences.

TABLE 2

Universal MMSE formulation for Type 3I

| Universal MMSE coefficient Formulation G (W, A, B, C) | Input Matrix W | Input Matrix A | Input Matrix B | Input Matrix C |
|---|---|---|---|---|
| No interference | W | $A = R_x$ | $B = H_{0,k}$ | $C = R_n^{-1}$ |
| Single interference | W | $A = R_x$ | $B = H_{0,k}$ | $C = R_n^{-1} (I_{4\times 4} - G_k^{(0)})$ |
| Two interferences | W | $A = R_x$ | $B = H_{0,k}$ | $C = R_n^{-1} (I_{4\times 4} - G_k^{(0)}) (I_{4\times 4} - G_k^{(1)})$ |

As can be seen by the values in Table 1 for the inputs of the final stage 330, Input Matrix W, Input Matrix A, and Input Matrix B are the same if there is no interference, a single interference, or two interferences. Input Matrix C for final stage 330 changes as shown in Table 2 based on the interference.

Figure 4:
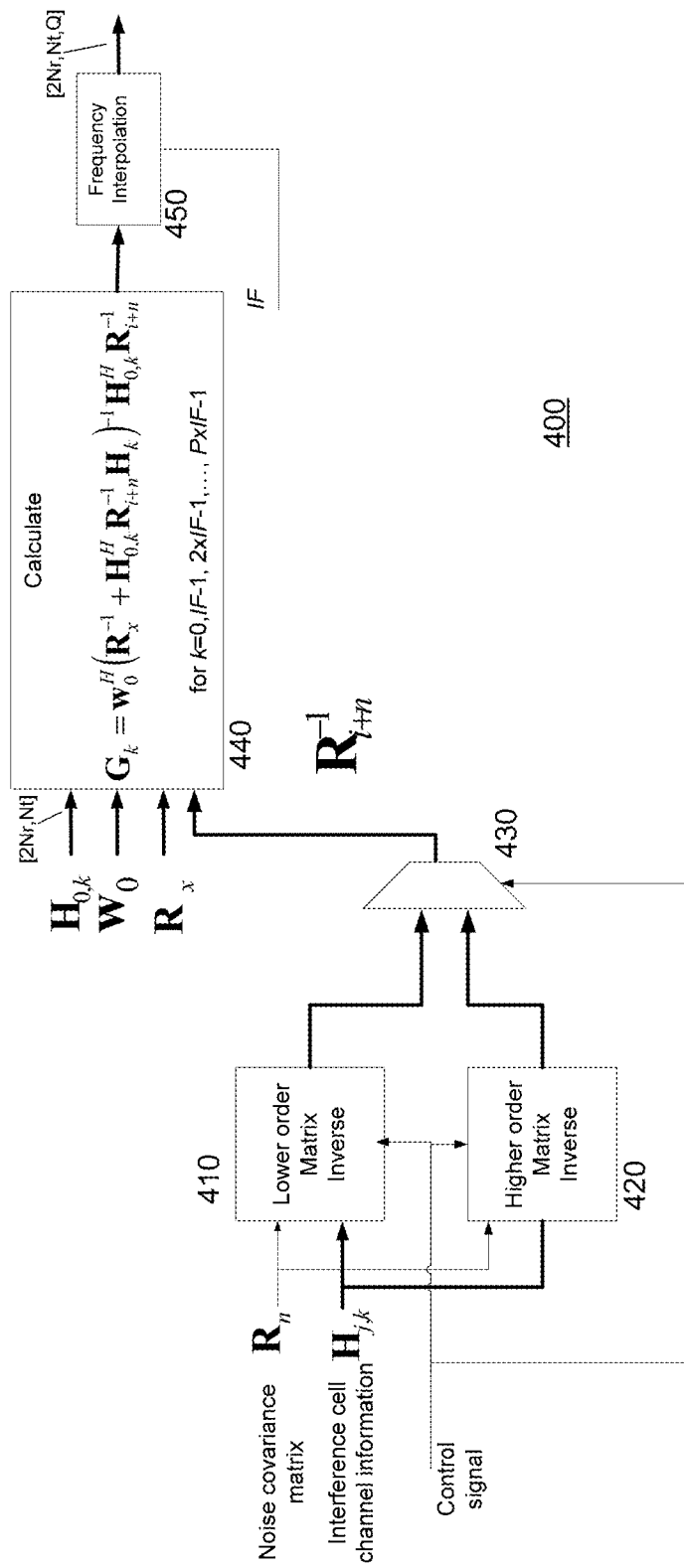
FIG. 4 is a diagram of an embodiment of a low power consumption FD-CL-EQ design.

FIG. 4 is a diagram of an embodiment of a low power consumption FD-CL-EQ design 400. In practice, if an FD-CL-EQ uses a regular MMSE formulation as described in Equation 2 then a higher order of matrix inverse for calculating EQ coefficients may be involved even when there is no interference cell detected in the receiver. As such, the power consumption may be higher because a higher order matrix inverse may require more computation complexity. To reduce the computation complexity and save power consumption, a smart design for an FD-CL-EQ may be desirable such as that depicted in FIG. 4.

Since interference cells may, at times, not be detected in the receiver, the alternative formulation of Equation 3 is provided as a baseline of a FD-CL-EQ design to avoid higher order matrix inverse computation when not needed. An auxiliary higher order matrix may be built for calculation of interference plus noise covariance matrix $R_{i+n,k}^{-1}$ described in Equation 5. As depicted in FIG. 4, the example embodiment of an FD-CL-EQ 400 may include a lower order matrix inverse operation 410 and its associated execution unit and a higher order matrix inverse operation 420 and its associated execution unit. When there is an interference cell detected in the receiver, the receiver may turn on the higher order matrix inverse operation 420. When there is no interference cell detected, the FD-CL-EQ may turn off the higher order matrix inverse operation 420 and may only use the lower order matrix inverse operation 410 to save on power by reducing computational complexity. A WTRU incorporating an FD-CL-EQ in accordance with the disclosed example embodiment may have the flexibility to save computation resources and power consumption. The interference plus noise covariance matrix may then be input into the equalization matrix calculation block 440. The equalization matrix $G_k$ may be output to a frequency interpolator 450 for frequency interpolation. An additional input to the frequency interpolator 450 may include an interpolation factor (IF) (e.g. 8) input, as depicted in FIG. 4.

Figures 5, 6:
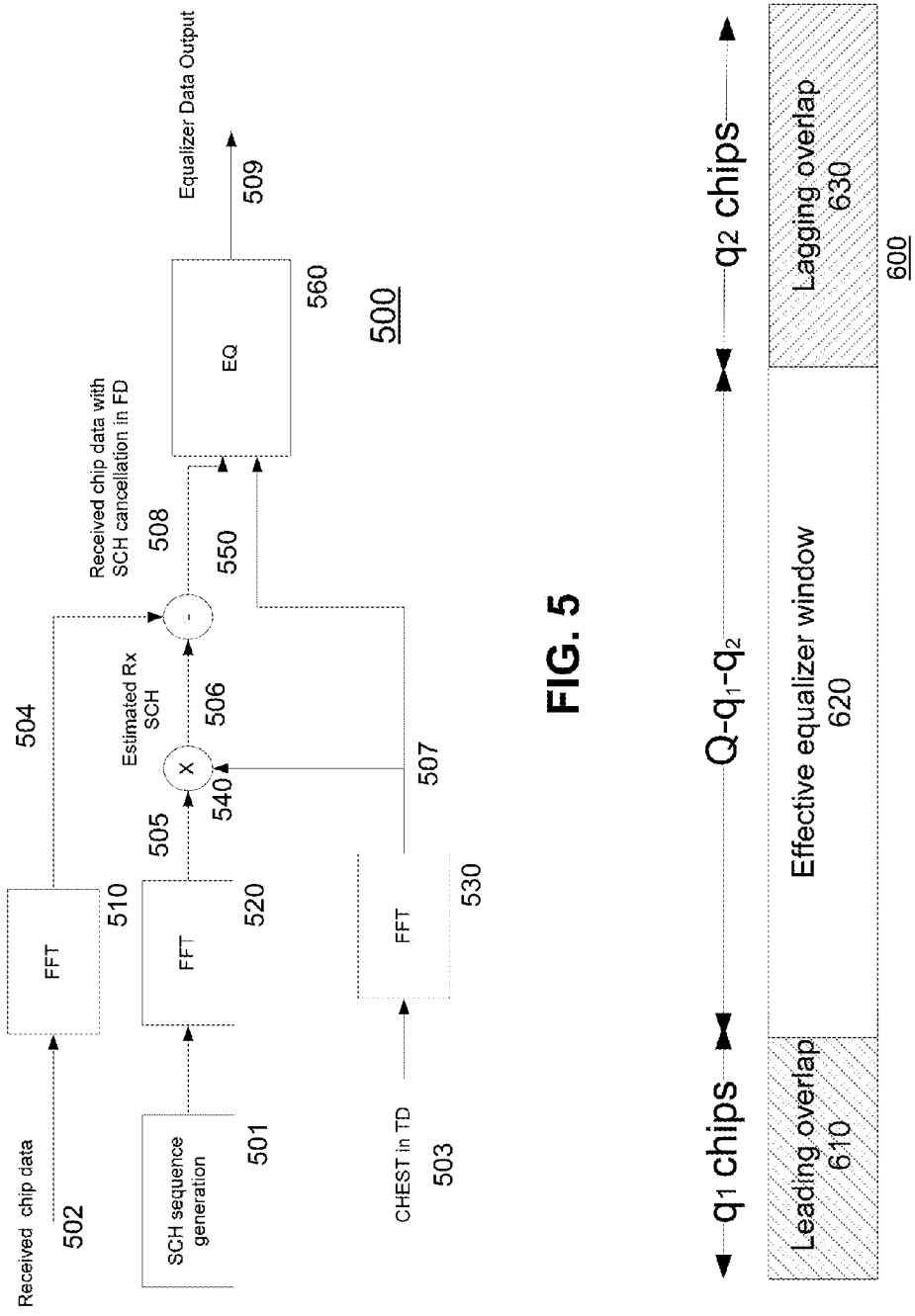
FIG. 5 is a diagram of an example embodiment of an FD-SCH canceller.
FIG. 6 is a diagram of an example equalizer window.

FIG. 5 is a diagram of an example embodiment of an FD-SCH canceller 500. The SCH cancellation algorithm works by directly subtracting an estimate of the received SCH signal from the total received signal. The estimate of the received SCH is created by scaling a copy of the SCH signal, generated locally or input from cell search component, with an FIR filter that uses the channel estimate as the filter taps. Scaling may be performed to align the channel estimate power to the SCH level instead of the pilot level by scaling by the square root of the ratio of the estimated SCH power over the estimated pilot power. SCH cancellation is feasible in the FD, hereafter, FD-SCH signal cancellation is performed by a FD-SCH canceller 500.

The FD-SCH canceller 500 provides advantages over TD convolution based methods. For example, there is no need to perform a time-domain convolution operation in the SCH cancellation stage. The FFT may be reused and the computation of FD CHEST coefficients processing may be reduced since it is already available for the FD-MMSE coefficients generation. Computation complexity may be further reduced since the cancellation is combined in the data equalization operation, i.e., joint SCH canceller with data equalization. Furthermore, time-latency due to conventionally waiting for the SCH cancellation to be finished prior to the process equalization stage may be reduced.

The example embodiment of an FD-SCH canceller 500 depicted in FIG. 5 may include SCH sequence generation 501 which is converted into FD by FFT 520. Received chip data 502 may also be converted into FD by FFT 510. CHEST in TD 503 may also be converted into FD by FFT 530. The FD version of the SCH sequence 505 may be multiplied with the FD version of the CHEST 507 at 540 to generate an estimated received SCH in FD 506. The estimated received SCH in FD 506 may be subtracted from the received chip data in FD 504 at 550 to generate received chip data with SCH cancellation in FD 508. The received chip data with SCH cancellation in FD 508 may be input into EQ 560 along with the CHEST in FD 507. The EQ 560 may output equalizer data output 509.

Comparing FIG. 5 with FIG. 2, the TD convolution operation 220 for the received SCH estimation in FIG. 2 may be replaced by the FD multiplication operation 540 in FIG. 5. This is the equivalent of taking the FD version of the generated SCH sequence 505 and point-wise multiplying it with CHEST information in the FD 507. In this way, there is negligible processing latency compared with the TD approach and reuse of the FFT operation is provided to reduce the convolution complexity.

MMSE complexity is proportional to the order of a matrix inverse. An example HSPA+ receiver configured in accordance with the embodiments described herein may reduce complexity by 50% by, for example, being able to reduce the matrix inverse from 4×4 to 2×2. Thus, the embodiments disclosed herein help to reduce complexity and power.

Embodiments of a joint FD-SCH canceller with input data processing is disclosed herein. In FD-CL-EQ, a data equalization unit may be called an equalizer window 600. FIG. 6 is a diagram of an example embodiment of an equalizer window 600 including three parts for, for example, an overlap-and-save procedure. Each equalizer window 600 may contain Q chips, which may include three segments: a leading overlap window of $q_1$ chips, effective equalizer window, and lagging overlap window of $q_2$ chip. Thus, the effective equalizer window length may be equal to $Q-q_1-q_2$. The equalizer window 600 may be the operation unit in the FD chip level equalizer. The size of the equalizer window 600 may be equal to the FFT size in chips.

Figure 7:
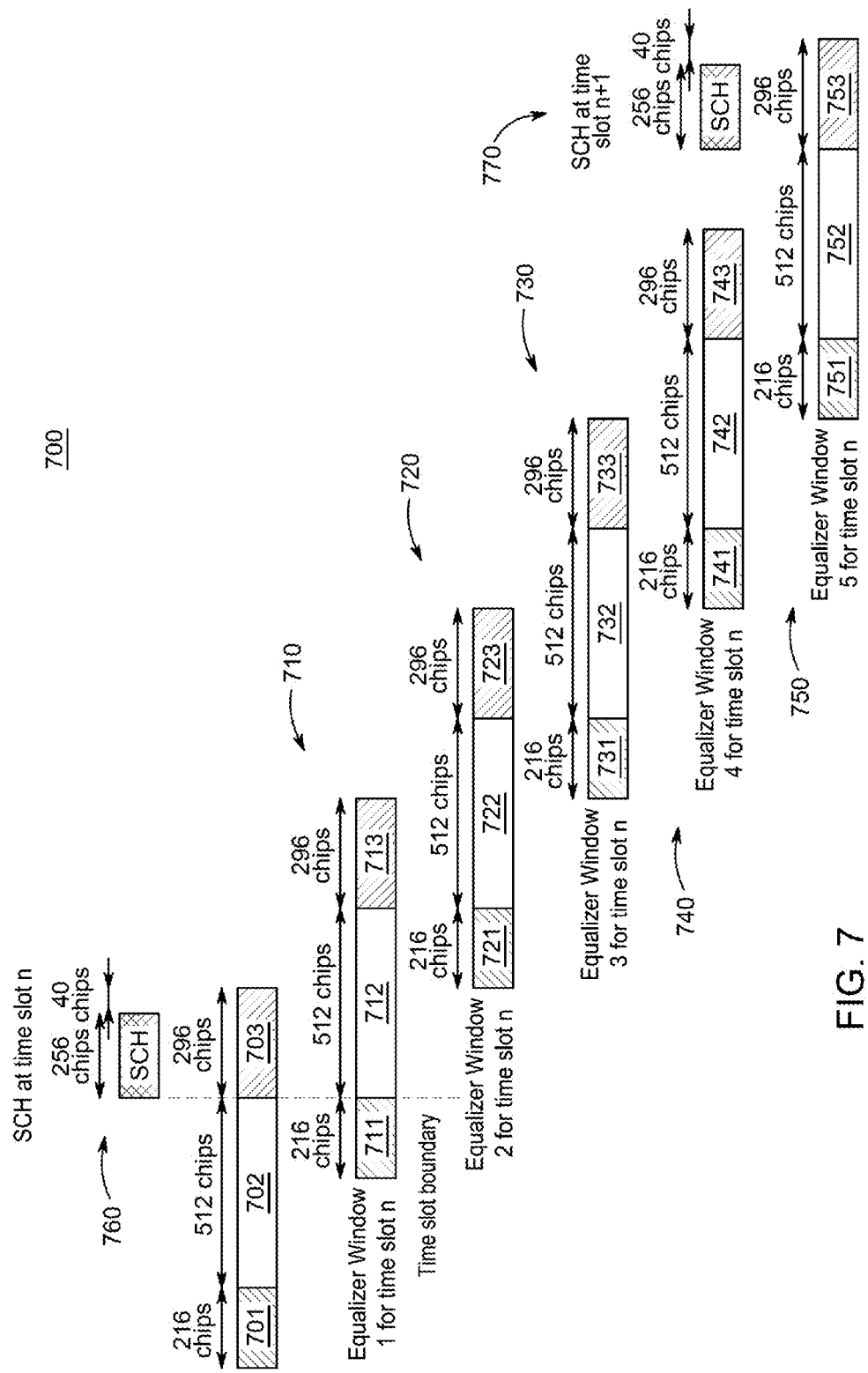
FIG. 7 is a diagram of an example embodiment of joint SCH cancellation with input data processing.

FIG. 7 is a diagram illustrating an embodiment of joint SCH cancellation with input data processing. For example, if there are 5 equalizer windows 710, 720, 730, 740, and 750 to be performed in a time-slot of an HSPA+ system, SCH cancellation may only be involved at equalizer windows 1 and 5. This is because the SCH is only transmitted at the beginning of 256 chips at every time slot. That is, SCH cancellation may be required at the beginning and the end of the time slot.

Asymmetric overlay-and-save regions for FD-SCH cancellation and data equalization designs are discussed herein. One of the challenges involved in the FD-SCH cancellation consideration is the SCH sequence length being at least less than the lagging window overlap, which is of a length of $q_2$ chips, in the equalizer window to avoid inter-symbol interference. In the embodiment depicted in FIG. 7, the SCH sequence may be 256 chips denoted as $L_{SCH}$=256 duration, which is less than the lagging window overlap length of 296, as shown by way of example in FIG. 7. In addition, it may be desired that $q_1 \geq L$ and $q_2 \geq L$ where L is the maximum assumed channel propagation length. For an asymmetric overlay-and-save region design for FD-SCH cancellation and EQ design, the following relationship may need to be met to ensure that there is no inter-symbol interference:

$$q_1 \geq L \text{ and } q_2 \geq L_{SCH} \geq L \qquad \text{(Equation 7)}$$

It should be understood that although the example embodiments disclosed herein are described with particular combinations of features, any sensible combination of the disclosed features across various embodiments fall within the scope of this disclosure. For example, SCH cancellation in accordance with any of the disclosed embodiments may be combined with the universal FD-CL-EQ and/or may be combined with selective use of lower-order matrix calculations when interference is not present.

As described above, as wireless communication systems, for example HSPA+ systems, move towards higher orders of modulation, such as 64QAM, noise and interference can have an increased effect on performance. Accurately reporting channel conditions representative of the amount of noise and interference being experienced is important to the overall performance of the wireless system. Herein disclosed are embodiments of methods and apparatuses for estimating a signal-to-interference (SIR) in a wireless system, for example a WCDMA system.

Figure 8:
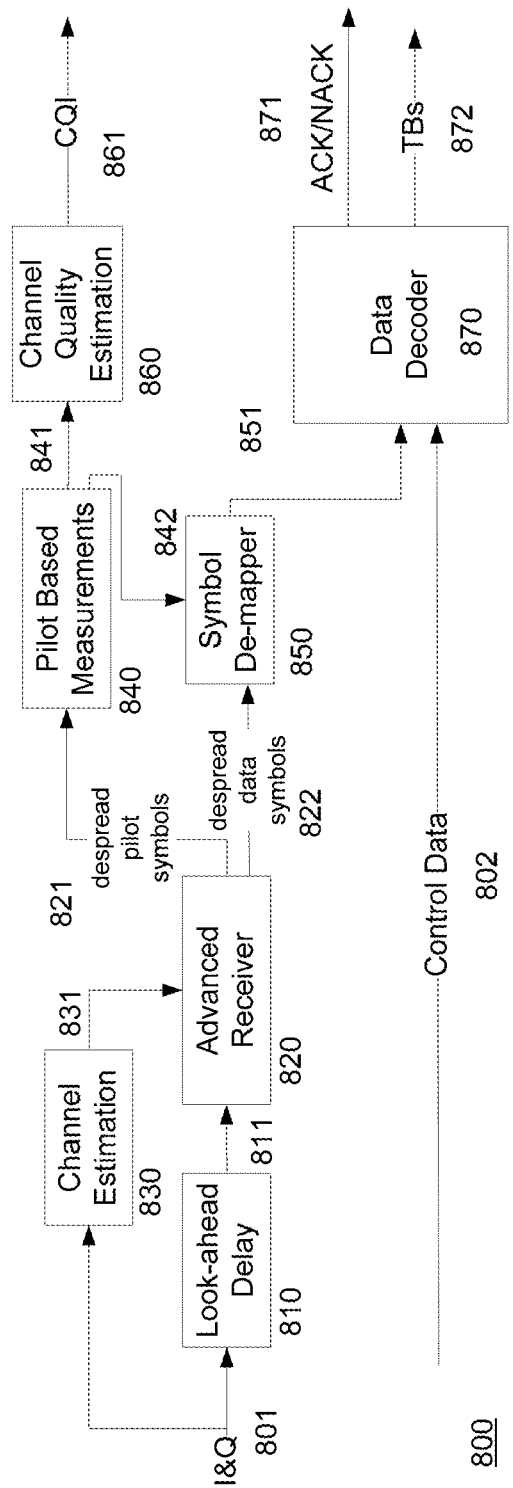
FIG. 8 is a diagram of an example embodiment of a high speed packet access plus (HSPA+) receiver structure.

FIG. 8 depicts a block diagram of an example embodiment of an HSPA+ receiver structure 800. The receiver 800 may receive in-phase and quadrature phase inputs 801 which may be input to a look-ahead delay unit 810 and a Channel Estimation unit 830. The output 811 of the look-ahead delay unit 810 and the output 831 of the Channel Estimation unit 830 may be input into an Advanced Receiver 820. Despread pilot symbols 821 and despread data symbols 822 may be output from the Advanced Receiver 820. The despread pilot symbols 821 may be input into a Pilot Based Measurements unit 840. Despread data symbols 822 may be input into a Symbol De-mapper unit 850. Furthermore, output 842 from the Pilot Based Measurements unit 840 may be input into Symbol De-mapper 850. Output 841 from the Pilot Based Measurements unit 840 may be input into a Channel Quality Estimation unit 860, and a channel quality indication (CQI) 861 may be output from the Channel Quality Estimation unit 860. Output 851 from the Symbol De-mapper 850 as well as Control Data 802 may be input into Data Decoder unit 870. Data Decoder unit 870 may output acknowledgement (ACK)/negative acknowledgement (NACK) information 871 as well as transport blocks (TBs) 872. The Common Pilot Channel in an HSPA Downlink and the Dedicated Pilot Channel in the uplink may be used as a reference for SINR measurements. In LTE, LTE-A systems the Cell-Specific Reference Symbols (CRS) and/or Channel State Information Reference Symbols (CSI-RS) may be used for SINR measurements in the downlink. A demodulation reference signal (DM-RS) may be used for the SINR measurements in the uplink.

Figure 9:
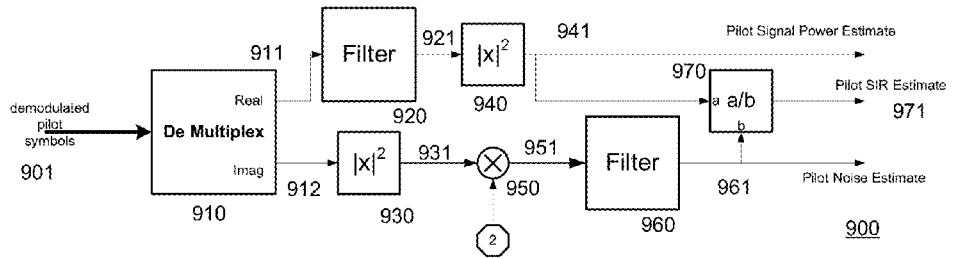
FIG. 9 is a diagram of pilot channel based signal-to-interference ratio (SIR) estimation logic using the imaginary part of a pilot symbol.

FIG. 9 depicts an embodiment of an apparatus 900, which may be found in a receiver, capable of estimating SIR, for example, in a WCDMA system. The apparatus 900 may receive demodulated pilot symbols 901 at Demultiplexer 910. Demultiplexer 910 may separate the demodulated pilot symbols 901 into a real part 911 and an imaginary part 912. A first filter 920 may be a low-pass filter and may filter the real part 911 and output the filtered real part 921 to a first power calculation unit 940 which outputs a power based on the real part 911 which may serve as a pilot signal power estimate 941. The imaginary part 912 of the demodulated pilot symbols 901 may be input into a second power calculation unit 930. The second power calculation unit 930 may output a power based on the imaginary part 931 which may be multiplied at multiplier 950 by a factor of 2 to generate multiplied output 951. Multiplied output 951 is input into a filter 960, such as a low-pass filter, to generate a filtered output 961. The filtered output 961 can serve as a pilot noise estimate. The pilot signal power estimate 941 may be divided by the pilot noise estimate 961 at noise estimation unit 970 to generate a pilot SIR estimate 971.

As described above with respect to the pilot noise estimate, the pilot noise estimate may be defined as follows:

$$\text{Pilot\_noise\_est} = \text{LPF}[2*|\text{Imag}(\text{demod\_pilot\_sym})|^2]. \quad \text{(Equation 8)}$$

The noise estimation may be based on the assumption that the demodulated pilot symbols have no phase error. However, this assumption is reasonable only if the filter delay in channel estimation is matched with an equivalent delay to the signal to be processed in the receiver, i.e. a look-ahead delay. In receiver systems with an exponential moving average (EMA)/infinite impulse response (IIR) filter structure in the channel estimator, wherein the group delay of the filter is a function of Doppler, the receiver signal delay may not be able to be matched for all cases while meeting standard-defined latency requirements.

This net delay offset between the channel estimates and input signal to the receiver may create a phase error on the processed signal out of the receiver. This phase rotation may be a function of the residual frequency offset in the received signal, which may be a by-product of closed-loop frequency correction. Given the magnitude of the mismatch of channel estimation to data delays, even very small residual frequency errors may introduce a significant phase error on the demodulated pilot symbols and may result in a substantially biased SINR estimate. This may be caused by a portion of the signal power rotating from the real portion of the symbol into the imaginary portion.

The phase error $\Theta$ can be defined as:

$$\Theta = 2*\Pi*f*\Delta t, \quad \text{(Equation 9)}$$

wherein f refers to frequency and the delay mismatch $\Delta t$ can be defined as:

$$\Delta t = \text{CHEST filter group delay} - \text{look-ahead delay}. \quad \text{(Equation 10)}$$

The expected SIR at a specific signal-to-noise ratio (SNR) may therefore be defined as:

$$\text{Expected SIR} = 10*\log_{10}\left(\frac{\cos\Theta*SNR}{\sin\Theta*SNR+1}\right), \quad \text{(Equation 11)}$$

which may result in a bias to the denominator, (sin $\Theta$*SNR+ 1), as a function of SNR and $\Theta$. This bias may result in large estimation errors at high values of SNR.

It should be noted that the SIR in E-UTRA systems may be calculated using similar techniques on cell-Specific Reference Symbols (CRS) and/or channel state information reference symbols (CSI-RS) in place of the pilot symbols.

Figure 10:
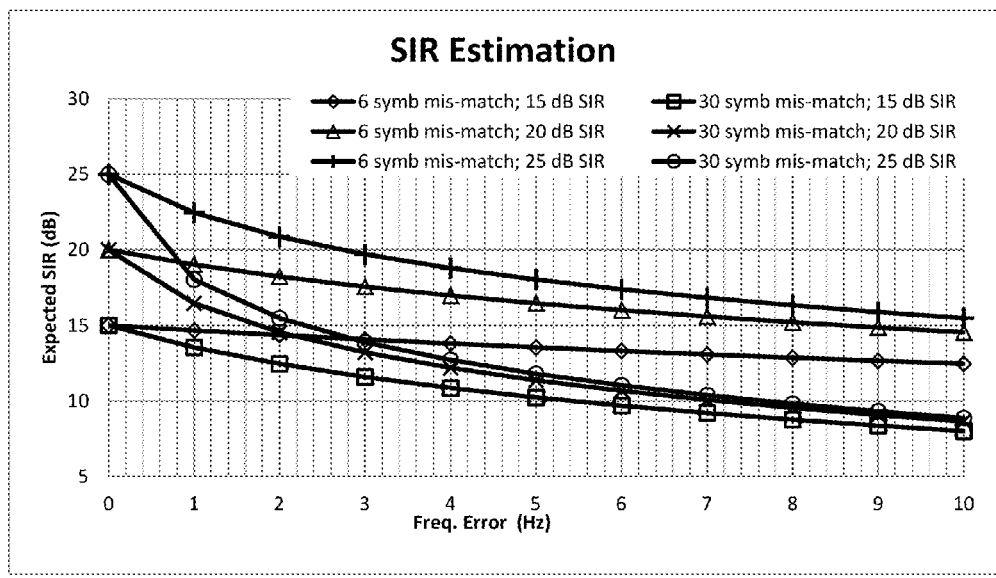
FIG. 10 is a graph of SIR estimation performance with phase error.

FIG. 10 is a plot is shown of SIR estimations with a nominal 6 symbol delay mismatch and worst case 30 symbol mismatch. The SIR estimates may be significantly biased when there is a large delay mismatch, and a high SIR can be seen even for a nominal delay mismatch. The noise and SIR estimate may be highly affected by phase error. In HSPA+ systems with higher order modulation, the receiver may be required to accurately report CQI in higher SIR ranges. SIR estimates such as those depicted in FIG. 10 have been shown to not meet these requirements with residual frequency errors. The bias in SIR estimate may degrade the CQI estimate as well as the SINR estimate for combining of re-transmissions of data.

Figure 11:
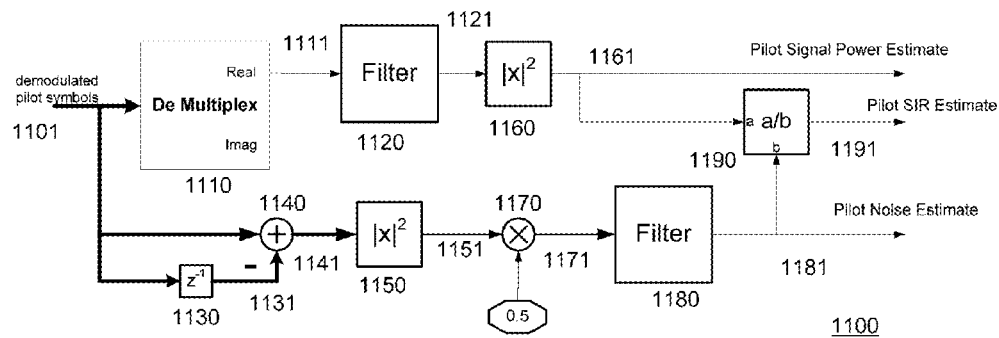
FIG. 11 is a diagram of pilot channel based SIR estimation logic using both the imaginary part and the real part of the pilot symbol.

FIG. 11 depicts a block diagram of an example embodiment of an apparatus 1100 configured to estimate an SIR in accordance with the teachings herein using a whole symbol to estimate noise power. The apparatus may be found in a receiver and the receiver may be used in a WCDMA or HSPA+ system. It should be noted that the estimation of the SIR in the WCDMA or HSPA+ system is provided as an example and the apparatus and method may be used to estimate an SIR for any wireless communication system.

The apparatus 1100 may receive demodulated pilot symbols 1101 at demultiplexer 1110. Demultiplexer 1110 may separate the pilot symbols to extract a real part 1111 and an imaginary part. A first filter 1120 may be a low-pass filter and may filter the real part 1121 and output the filtered real part 1121 to a first power calculation unit 1160 which outputs a power of the real part 1161 which may serve as a pilot signal power estimate 1161. A delay unit 1130 may be configured to perform a unit delay operation on the demodulated pilot symbols 1101 and generate a delayed demodulated pilot symbol 1131, including both the real and imaginary parts. The delay unit 1130 may delay the demodulated pilot symbols 1101 by 1 sample. The adder-subtractor 1140 may be configured to compute the difference between the demodulated pilot symbols 1101 and the delayed demodulated pilot symbol 1131 and may be further configured to generate a differential whole signal 1141 by, for example, subtracting a delayed demodulated pilot symbol 1131 from a non-delayed demodulated pilot symbol 1101. A second power calculation unit 1150 may be configured to compute the power of the differential whole signal 1141. The multiplier 1170 may be configured to halve the power of the differential whole signal and generate a noise power 1171. The noise power 1171 may be input into a filter 1180, such as a low-pass filter. The filtered output 1181 can serve as a pilot noise estimate 1181. The pilot signal power estimate 1161 may be divided by the pilot noise estimate 1181 at noise estimation unit 1190 to generate a pilot SIR estimate 1191.

It should be noted that the whole signal of the demodulated pilot symbols, both the real part and the imaginary part, may be used to compute the noise power. Accordingly, a New Pilot Noise Estimate can be defined as follows:

$$\text{Pilot\_noise\_est\_new} = \text{LPF}[0.5*|\text{demod\_pilot\_sym}_n - \text{demod\_pilot\_sym}_{n-1}|^2]. \quad \text{(Equation 12)}$$

In an embodiment, the apparatus may receive a demodulated pilot symbol sequence. It should be noted that the SIR in E-UTRA systems may be calculated using similar techniques on cell-Specific Reference Symbols (CRS) and/or channel state information reference symbols (CSI-RS) in place of the pilot symbols.

Embodiments of methods and apparatuses configured to estimate noise in accordance with the teachings herein may be robust against phase errors on the processed symbols out of a receiver. Embodiments benefit from a property of adjacent symbols wherein it may be reasonably assumed that the desired signal phase/amplitude is constant across adjacent symbols even at very high Doppler. By generating a differential signal including both the real and imaginary parts of the demodulated pilot symbols, sensitivity to residual frequency errors may be reduced or removed. Furthermore, this differential approach may also provide estimates with smaller variance and a corresponding higher accuracy.

Figure 12:
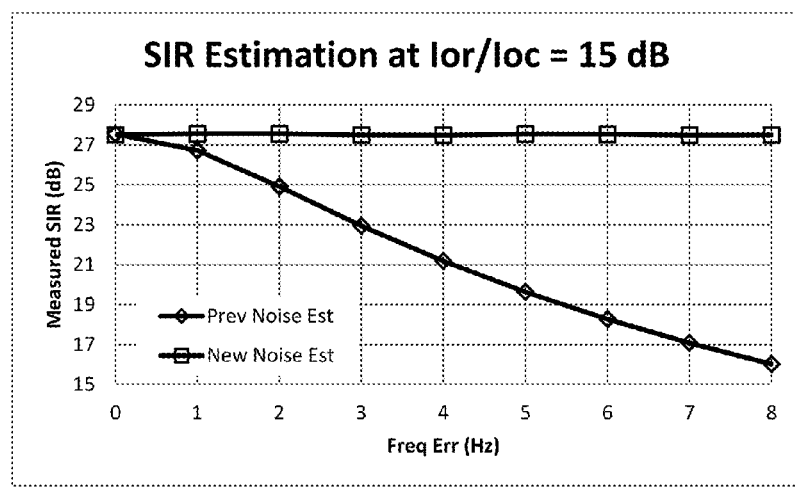
FIG. 12 is a graph illustrating SIR estimation performance comparing two methods of pilot channel SIR estimation.

FIG. 12 is a graph representing a comparison of SIR estimation using the embodiment described above in accordance with FIG. 9 and the embodiment described above in accordance with FIG. 11. Both SIR estimates were calculated in the presence of frequency errors. As shown in FIG. 11, the New Noise Est, which may be the estimate corresponding to the embodiment shown in FIG. 11, may be much less sensitive to frequency errors than the Prey Noise Est, which may be the estimate corresponding to the embodiment shown in FIG. 9.

A WTRU may be allocated resources based on reported channel conditions, such as those based on a reported pilot SIR estimate. The WTRU may be allocated more resources to transmit/receive at higher data rates when the channel conditions are better and can support the higher rates. The phase errors described herein led to conventional WTRUs reporting lower SIR/SNR, and hence worse channel conditions, than actually experienced. Thus, the conventional WTRUs were allocated less of the available resources than the WTRUs could reliably support. The report of a more accurate noise estimation of the pilot channel in accordance with the embodiments disclosed herein may enable WTRUs to report more accurate SIR/SNR estimates, which therefore may lead to the WTRU being more accurately allocated resources which may lead to overall better use of available system resources.

It should be understood that although the example embodiments disclosed herein are described with particular combinations of features, any sensible combination of the disclosed features across various embodiments fall within the scope of this disclosure. For example, an embodiment of a WTRU may include a receiver that performs SCH cancellation in accordance with the teachings herein and further performs pilot SIR estimation in accordance in accordance with the teachings herein. As another example, an embodiment of a WTRU may equalize a channel using FD SCH cancellation and then may report an estimated channel condition represented by a pilot SIR estimation using a power of a differential data symbol that includes both the real and imaginary parts of the demodulated pilot symbol as described above.

Figure 13:
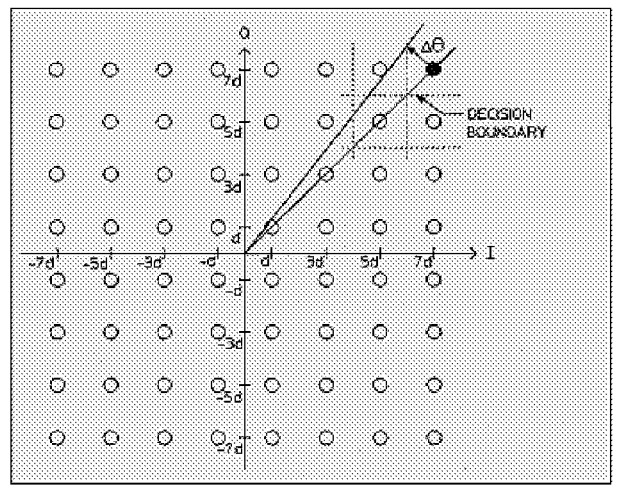
FIG. 13 is a 64 quadrature amplitude modulation (QAM) constellation diagram.

As referenced above, WCDMA-based HSPA+, OFDM-based LTE/LTE-A, and OFDM-based IEEE 802.11 systems may employ higher-order modulation schemes in order to achieve high data rates. In 64QAM applications, the constellation points may be closely spaced and have a very small angular separation. FIG. 13 depicts an example 64QAM constellation with 64 different constellation points corresponding to the different possible complex values of a data symbol transmitted via 64QAM. As a constellation increases in constellation points, the angular separation between constellation points decreases which may increase the likelihood of data symbol errors for a given noise level. For a 64QAM constellation, angular separation can be as small as 9.46 degrees, for example.

Figure 14:
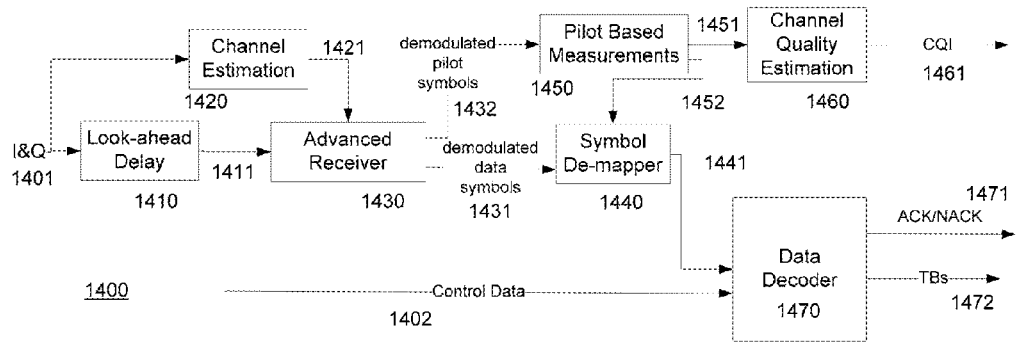
FIG. 14 is a diagram of an example embodiment of a receiver structure.

FIG. 14 depicts a diagram of an example embodiment of a receiver 1400. In-phase and quadrature-phase signals, which may also be viewed as complex signals, may be received at 1401 and input into channel estimation unit 1420 and look-ahead delay unit 1410. The channel estimation unit 1420 may employ an averaging filter to improve the quality of its estimates. At low Doppler, the filter can apply more averaging as the channel changes slowly. This feature may be relevant for 64QAM applications whose performance is sensitive to the quality of channel estimates. In general, group delay is a function of the Doppler. Group delay may be larger in low Doppler scenarios and may be smaller in high Doppler scenarios.

Look-ahead delay 1410 may match filter delay through channel estimation 1420 with an equivalent delay in the signal 1411 to be processed in the advanced receiver 1430 to avoid phase errors in the demodulated symbols 1431. Because the group delay in the CHEST filter may be a function of Doppler and may be present in the output 1421, it may not be possible to match the look-ahead delay 1410 with the filter group delay while meeting latency requirements. A mismatch in the delays may introduce phase rotation in the symbols 1411 processed by the advanced receiver 1430. This phase rotation may be a function of the residual frequency offset in the received signal, which may be a by-product of closed loop frequency correction. Given the magnitude of the mismatch of channel estimation to data delays, even small residual frequency errors may introduce a significant phase error on the demodulated data symbols 1431 output from the advanced receiver 1430. The phase error may be defined as shown in Equation 9 above.

The advanced receiver 1430 may output demodulated pilot symbols 1432 and demodulated data symbols 1431. The pilot based measurements unit 1450 may be configured to input the demodulated pilot symbols 1432 and output measurement results 1451 and 1452. The channel quality estimation unit 1460 may use the measurements 1451 to generate CQI 1461. The symbol de-mapper 1440 may input the demodulated data symbols 1431 and measurements 1452 and output de-mapped symbols 1441 to data decoder 1470. The data decoder 1470 may also input control data 1402 and may output ACK/NACK information 1471 and TBs 1472.

Phase error may cause decoding errors in 64QAM applications where the angular separation is very small, potentially resulting in poor performance. For example, the phase rotation error may be in the order of 4-5 degrees at low Doppler for RMS frequency errors of 5-7 Hz. In state-of-the-art radios whose interfaces for oscillator frequency control have step-sizes around 10-12 Hz, the phase error introduced may be up to 9 degrees. Accordingly, additional phase compensation may be desired prior to soft symbol de-mapping to mitigate decoding errors.

Figure 15:
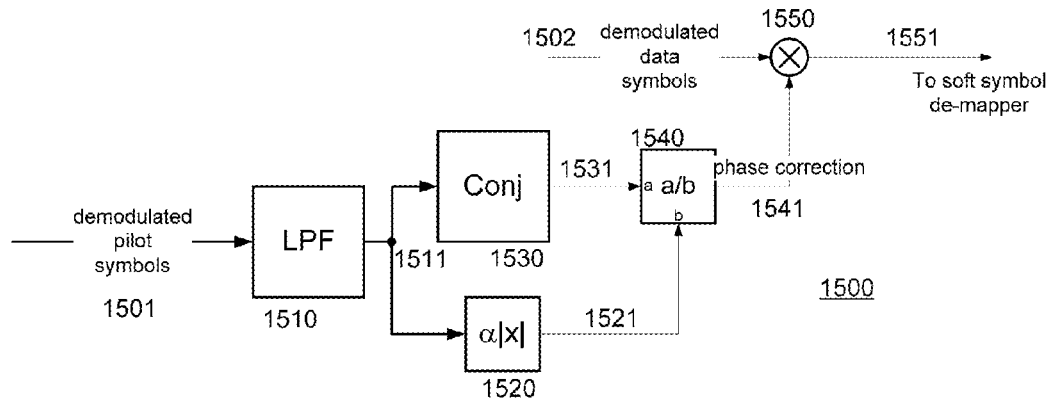
FIG. 15 is a diagram of an example embodiment of phase compensation logic.

Data symbol phase error may be estimated using the demodulated pilot channel symbols from the receiver. This phase compensation may be applied to the demodulated data symbols prior to soft symbol de-mapping. FIG. 15 depicts an example embodiment of phase compensation logic 1500. Demodulated pilot symbols 1501 may be filtered by a low-pass filter (LPF) 1510. The demodulated pilot symbols 1501 may include in-phase and quadrature-phase signals, or may also be similarly viewed as complex symbols each having a real part and an imaginary part. The output 1511 of the LPF 1510 may be input into a conjugate unit 1530 which outputs the complex conjugate 1531 of the complex, low-pass filtered demodulated pilot symbols 1511. Thus, the complex conjugate 1531 may have an opposite phase of the input 1511 to the conjugate unit 1530. The output 1511 of the LPF 1510 may also be input into a magnitude unit 1520 which may produce as output 1521 a scaled magnitude of its input 1511. Phase correction unit 1540 may divide the output 1531 of the conjugate unit 1530 by the output 1521 of the magnitude unit 1520 and may produce the result as phase correction 1541. Demodulated data symbols 1502 may be multiplied by the phase correction 1541 at multiplier 1550 to produce phase corrected, demodulated data symbols 1551. The phase corrected, demodulated data symbols 1551 may be sent to, for example, a soft symbol de-mapper (not shown).

The term $\alpha$ depicted in the magnitude unit 1520 refers to an additional factor that may be required to divide into the signal at some other stage. Combining the additional factor at magnitude unit 1520 may reduce the need for a separate division. For example, the additional factor could be a normalization coefficient in the soft symbol demapper that may depend on the type of constellation and SNR. If no additional factor is required, this design may be implemented using $\alpha=1$.

The logic 1500 depicted in FIG. 15 includes a magnitude unit 1520. In practical applications the phase error ($\Theta$) may likely be less than 10 degrees. Because $\sin(\Theta)\approx 0$ in that case, a function of the magnitude unit 1520 may be approximated as the real part of the filtered pilot. Thus, $$|LPF(demod\_pilot\_sym)| \cong Real[LPF(demod\_pilot\_sym)] \quad \text{(Equation 13)}$$

Figure 16:
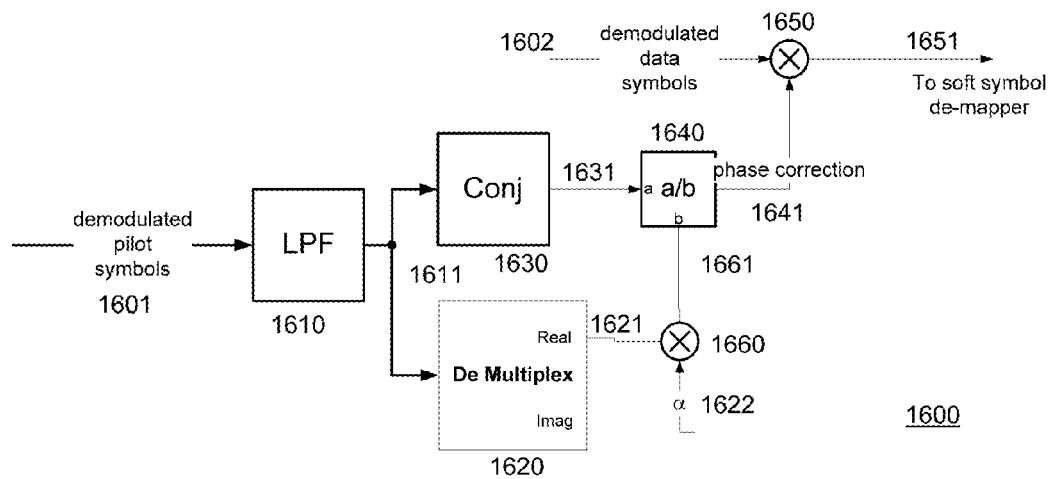
FIG. 16 is a diagram of another example embodiment of phase compensation logic.

In Equation 13, demod_pilot_sym refers to the demodulated pilot symbol, and LPF refers to a low-pass filtering function or operation that performs a weighted average of its input as performed by LPF 1510 in FIG. 15. The logic 1500 in FIG. 15 may be simplified to that shown in FIG. 16 for implementation purposes in accordance with the approximation of Equation 13. In FIG. 16, demultiplexer 1620 takes as input the output 1611 of the LPF 1610, and may produce as output 1621 the real portion of its input 1611. The real portion 1621 may then be multiplied by a 1622 at multiplier 1660, and the product 1661 may be input into the phase correction unit 1640. Equation 14 represents phase correction output 1641 of the phase compensation unit 1640 in FIG. 16:

$$phase\_corr = \frac{LPF(demod\_cpich\_sym)^*}{\alpha Real(LPF(demod\_cpich\_sym))}, \quad \text{(Equation 14)}$$

where phase_corr refers to phase correction 1641, demod_cpich_sym refers to the demodulated pilot symbol, and LPF refers to a low-pass filtering function or operation that performs a weighted average of its input as implemented by LPF 1610.

Figure 17:
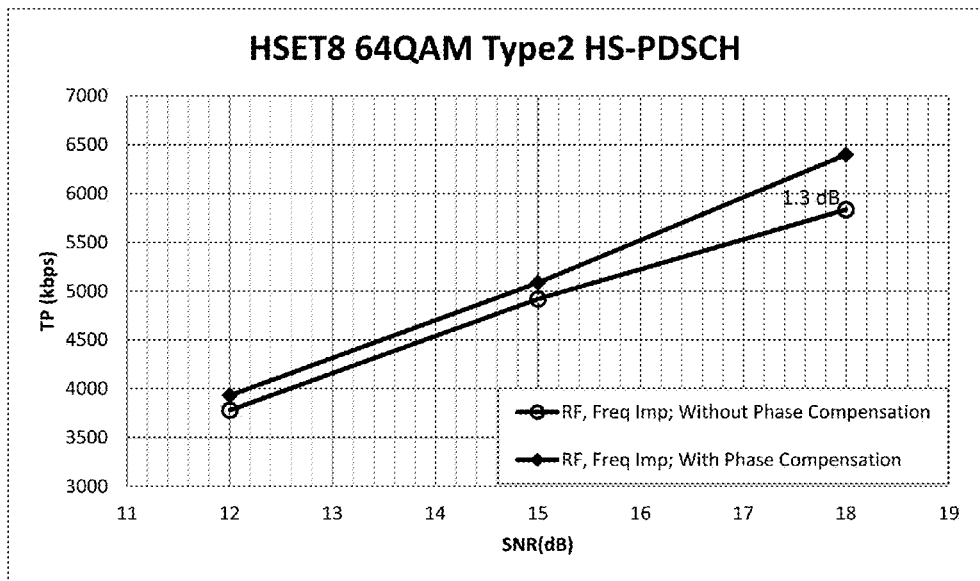
FIG. 17 is a graph of data throughput for different signal-to-noise ratios (SNRs) with and without phase compensation.

FIG. 17 is a graph that illustrates an example performance improvement of 1.3 dB with phase compensation in a HSPA+ system at high SNR with 64QAM modulation and with radio and frequency impairments. In this example the observed root mean square (RMS) residual frequency error under these conditions is in the order of 5-7 Hz.

Figure 18:
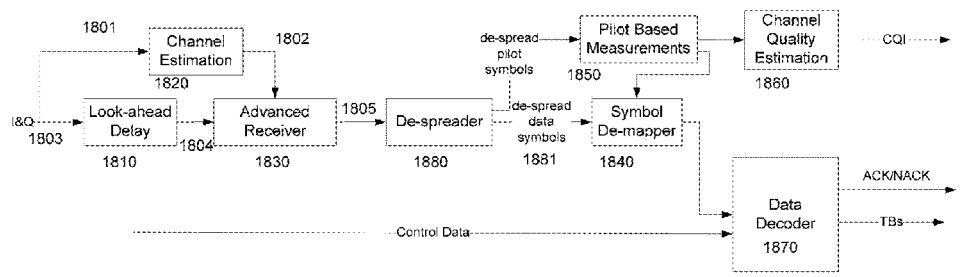
FIG. 18 is a diagram of a receiver and alternative points to introduce phase correction.

Referring to FIG. 18, phase correction may be applied to the de-spread data symbols 1881, prior to symbol de-mapper 1840. The performance depicted in FIG. 17 corresponds to a phase correction at such a location 1881 in FIG. 18. Alternatively, the phase may also be corrected at any of points 1801, 1802, 1803, 1804, or 1805 as shown in FIG. 18. For example, phase correction may be applied at 1801 which corresponds to the input to channel estimation unit 1820. Phase correction may alternatively be applied at 1802 which corresponds to the output of channel estimation unit 1820. Phase correction may alternatively be applied at 1803 which corresponds to the input to the look-ahead delay unit 1810. Phase correction may alternatively be applied at 1804 to the output of the look-ahead delay unit 1810. Phase correction may alternatively be applied at 1805 to the output of the advanced receiver 1830 prior to de-spreader 1880, for example, for HSPA+ systems.

To apply the phase correction at the additional points 1801, 1802, 1803, 1804, or 1805, an additional loop filter (not shown) or integrator (also not shown) may be required to correct for phase offsets. The location of such loop filter may depend upon where the phase correction is applied, e.g., which of points 1801-1805. If the phase correction is applied to the demodulated data symbols prior to symbol de-mapper 1840, additional filtering may not be required.

64QAM symbol transmission involves a densely packed signal constellation. Thus, in high SNR conditions, demodulated data symbols are highly susceptible to errors. Phase errors caused by noise and interference can be compensated in accordance with the embodiments disclosed herein to improve performance by approximately 1.3 dB at high SNR with 64QAM.

It should be understood that although the example embodiments disclosed herein are described with particular combinations of features, any sensible combination of the disclosed features across various embodiments fall within the scope of this disclosure. For example, an embodiment of a WTRU may include a receiver configured to perform SCH cancellation, pilot SIR estimation, phase compensation, and use the phase compensation to properly demodulate received data symbols. As another example, an embodiment of a receiver may be configured to selectively use a lower-order matrix inverse for calculating the inverse of a noise covariance matrix when interference is not detected, and also implement phase compensation for symbol demodulation in accordance with the teachings herein before a channel estimation filter.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed is:

1. A wireless transmit receive unit (WTRU), the WTRU comprising:
 a processor and a receiver operably coupled to the processor, the processor and receiver configured to:
 input a complex demodulated pilot symbol and a complex demodulated data symbol;
 generate a conjugate demodulated pilot symbol based on the complex demodulated pilot symbol;
 generate a demodulated pilot symbol magnitude based on the complex demodulated pilot symbol;
 determine a phase correction based on a ratio of the conjugate demodulated pilot symbol and the demodulated pilot symbol magnitude; and
 generate a phase corrected, demodulated data symbol based on the complex demodulated data symbol and the phase correction.

2. The WTRU of claim 1, wherein the processor and receiver are further configured to generate the phase corrected, demodulated data symbol at least by multiplying the complex demodulated data symbol by the phase correction.

3. The WTRU of claim 1, wherein the processor and receiver are further configured to:
 generate the conjugate demodulated pilot symbol based on a low-pass filtered version of the complex demodulated pilot symbol; and
 generate the demodulated pilot symbol magnitude based on the low-pass filtered version of the complex demodulated pilot symbol.

4. The WTRU of claim 3, wherein the low-pass filtered version of the complex demodulated pilot symbol is a weighted average of the complex demodulated pilot symbol.

5. The WTRU of claim 1, wherein the demodulated pilot symbol magnitude is scaled by a scaling factor.

6. The WTRU of claim 1, wherein the demodulated pilot symbol magnitude is based on a real part of the complex demodulated pilot symbol.

7. The WTRU of claim 6, wherein the processor and receiver are further configured to multiply the real part of the complex demodulated pilot symbol by a scaling factor.

8. The WTRU of claim 1, wherein the processor and receiver are further configured to generate a soft-symbol de-mapped data symbol based on the phase corrected, demodulated data symbol.

9. The WTRU of claim 8, wherein the processor and receiver are further configured to output ACK/NACK information and at least one transport block (TB) based at least on the soft-symbol de-mapped data symbol.

10. The WTRU of claim 1, wherein the complex demodulated pilot symbol and complex demodulated data symbol are received in a High Speed Packet Access (HSPA+) system using a 64-quadrature amplitude modulation (64QAM) constellation.

11. A method for use by a wireless transmit receive unit (WTRU), the method comprising:
 inputting a complex demodulated pilot symbol and a complex demodulated data symbol;
 generating a conjugate demodulated pilot symbol based on the complex demodulated pilot symbol;
 generating a demodulated pilot symbol magnitude based on the complex demodulated pilot symbol;
 determining a phase correction based on a ratio of the conjugate demodulated pilot symbol and the demodulated pilot symbol magnitude; and
 generating a phase corrected, demodulated data symbol based on the complex demodulated data symbol and the phase correction.

12. The method of claim 11, wherein the generating the phase corrected, demodulated data symbol includes at least multiplying the complex demodulated data symbol by the phase correction.

13. The method of claim 11, wherein:
 the generating the conjugate demodulated pilot symbol is based on a low-pass filtered version of the complex demodulated pilot symbol; and
 the generating the demodulated pilot symbol magnitude is based on the low-pass filtered version of the complex demodulated pilot symbol.

14. The method of claim 13, wherein the low-pass filtered version of the complex demodulated pilot symbol is a weighted average of the complex demodulated pilot symbol.

15. The method of claim 11, wherein the demodulated pilot symbol magnitude is scaled by a scaling factor.

16. The method of claim 11, wherein the demodulated pilot symbol magnitude is based on a real part of the complex demodulated pilot symbol.

17. The method of claim 16 further comprising multiplying the real part of the complex demodulated pilot symbol by a scaling factor.

18. The method of claim 11 further comprising generating a soft-symbol de-mapped data symbol based on the phase corrected, demodulated data symbol.

19. The method of claim 18 further comprising outputting ACK/NACK information and at least one transport block (TB) based at least on the soft-symbol de-mapped data symbol.

20. The method of claim 11, wherein the complex demodulated pilot symbol and complex demodulated data symbol are received in a High Speed Packet Access (HSPA+) system using a 64-quadrature amplitude modulation (64QAM) constellation.

* * * * *